US 11,582,268 B2

(12) United States Patent
Karampatsis et al.

(10) Patent No.: US 11,582,268 B2
(45) Date of Patent: Feb. 14, 2023

(54) ESTABLISHING A CONNECTION WITH A DUAL REGISTERED DEVICE

(71) Applicant: Lenovo (Singapore) PTE. LTD., New Tech Park (SG)

(72) Inventors: Dimitrios Karampatsis, Ruislip (GB); Roozbeh Atarius, La Jolla, CA (US); Andreas Kunz, Ladenburg (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/683,595

(22) Filed: Nov. 14, 2019

(65) Prior Publication Data

US 2020/0153875 A1 May 14, 2020

Related U.S. Application Data

(60) Provisional application No. 62/767,274, filed on Nov. 14, 2018.

(51) Int. Cl.
*H04L 65/1069* (2022.01)
*H04L 65/1016* (2022.01)
(Continued)

(52) U.S. Cl.
CPC ...... *H04L 65/1069* (2013.01); *H04L 65/1016* (2013.01); *H04W 60/005* (2013.01); *H04W 88/06* (2013.01)

(58) Field of Classification Search
CPC ............. H04L 65/1069; H04L 65/1016; H04L 65/1073; H04W 60/005; H04W 88/06; H04W 8/04; H04W 76/10
See application file for complete search history.

(56) References Cited

U.S. PATENT DOCUMENTS 10,708,318 B2 * 7/2020 Qiao ................... H04L 65/1016
2018/0110089 A1 * 4/2018 Österlund ........... H04L 65/1063
(Continued)

OTHER PUBLICATIONS

MTTDOCOMO,"T-ADSwithdualregisteredUE"3GPPTSG-SAWG2Meeting#125S2-180747,Jan. 22-26, 2018,pp. 1-3 (Year: 2018).*

(Continued)

*Primary Examiner* — Thu V Nguyen
*Assistant Examiner* — Aye M Aung
(74) *Attorney, Agent, or Firm* — Kunzler Bean & Adamson

(57) ABSTRACT

Apparatuses, methods, and systems are disclosed for establishing a connection with a dual registered device. One method includes receiving a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. The method includes determining first information corresponding to a network access connectivity selected from the first network access and the second network access through which the first device has internet protocol connectivity with the internet protocol multimedia subsystem. The method includes transmitting a second request to a first network function to retrieve second information.

16 Claims, 15 Drawing Sheets

(51) Int. Cl.
*H04W 60/00* (2009.01)
*H04W 88/06* (2009.01)

(56) References Cited

U.S. PATENT DOCUMENTS

| | | | |
|---|---|---|---|
| 2018/0132141 | A1 | 5/2018 | Huang-Fu et al. |
| 2019/0254083 | A1* | 8/2019 | Stammers ............ H04W 76/10 |
| 2019/0327666 | A1* | 10/2019 | Bouvet ................ H04W 48/16 |
| 2019/0387407 | A1* | 12/2019 | Jost .................... H04W 12/104 |
| 2020/0120541 | A1* | 4/2020 | Wang ................... H04L 47/125 |
| 2020/0120585 | A1* | 4/2020 | Kumar ................ H04W 60/00 |
| 2020/0275331 | A1* | 8/2020 | Kim .................. H04W 36/0033 |
| 2020/0336517 | A1* | 10/2020 | Qiao ................... H04L 65/1069 |

OTHER PUBLICATIONS

NTT DOCOMO, T-ADS with dual registered UE; 3GPP TSG-SA WG2 Meeting #125, Gothenburg, Sweden, Jan. 22-26, 2018 (Year: 2018).*

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.5.0, Sep. 2018, pp. 1-410.

3GPP, "3rd Generation Partnership Project; Technical Specification Group Core Network and Terminals; IMS Restoration Procedures (Release 15)", 3GPP TS 23.380 V15.0.0, Jun. 2018, pp. 1-54.

3GPP, "3rd Generation Partnership Project; Technical Specification Group Services and System Aspects; Procedures for the 5G System; Stage 2 (Release 15)", 3GPP TS 23.502 V15.3.0, Sep. 2018, pp. 1-330.

3GPP, "3rd Generation Partnership Project; Technical Specification Group Core Network and Terminals; Sh Interface based on the Diameter protocol; Protocol details (Release 15)", 3GPP Ts 29.329 V15.1.0, Jun. 2018, pp. 1-25.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 15)", 3GPP TS 24.229 V15.4.0, Sep. 2018, pp. 1-1039.

3GPP, "3rd Generation Partnership Project; Technical Specification Group Core Network and Terminals; 5G System; Usage of the Unified Data Repository services for Subscription Data; Stage 3 (Release 15)", 3GPP TS 29.505 V15.1.0, pp. 1-67.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.

3GPP, "3rd Generation Partnership Project; Technical Specification Group Core Network and Terminals; Interconnection Border Control Functions (IBCF)—Transition Gateway (TrGW) interface, Ix Interface; Stage 3 (Release 15)", 3GPP TS 29.238 V15.0.0, Oct. 2018, pp. 1-86.

PCT/IB2019/001257, "Notification of Transmittal of the International Search Report and the Written Onion of the International Searching Authority, or the Declaration", PCT, Mar. 31, 2020, pp. 1-12.

Ericsson et al., "Interworking without N26 corrections", 3GPP TSG-SA WG2 Meeting #126 S2-182378, Feb. 26-Mar. 2, 2018, pp. 1-3.

3GPP, "3rd Generation Partnership Project; Technical Specification Group Services and System Aspects; Study on User data interworking, Coexistence and Migration (Release 16)", 3GPP TR 23.732 V0.2.1, Sep. 2018, pp. 1-18.

Motorola Mobility et al., Support of Dual Registration in Solution 1, SA WG2 Meeting #129bis S2-1812569, Nov. 16-Nov. 30, 2018, pp. 1-12.

NTT DOCOMO, "T-ADS with dual registered UE", 3GPP TSG-SA WG2 Meeting #125 S2-180747, Jan. 22-26, 2018, pp. 1-3.

* cited by examiner

ESTABLISHING A CONNECTION WITH A DUAL REGISTERED DEVICE

CROSS-REFERENCE TO RELATED APPLICATIONS

This application claims priority to U.S. Patent Application Ser. No. 62/767,274 entitled "HANDLING IMS DOMAIN SELECTION AND P-CSCF RESTORATION IN IMS IF A UE IS DUAL REGISTERED IN EPS AND 5G CORE NETWORKS" and filed on Nov. 14, 2018 for Dimitrios Karampatsis, which is incorporated herein by reference in its entirety.

FIELD

The subject matter disclosed herein relates generally to wireless communications and more particularly relates to establishing a connection with a dual registered device.

BACKGROUND

The following abbreviations are herewith defined, at least some of which are referred to within the following description: Third Generation Partnership Project ("3GPP"), $5^{th}$ Generation ("5G"), 5G Core Network ("5GC"), 5G System ("5GS"), Positive-Acknowledgment ("ACK"), Access and Mobility Management Function ("AMF"), Access Point ("AP"), Application Server ("AS"), Attribute Value Pair ("AVP"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Dual Registration ("DR"), Data Radio Bearer ("DRB"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), Evolved Packet Core Network ("EPC"), Evolved Packet System ("EPS"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Front End ("FE"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), IP Multimedia Subsystem ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), Mobile Termination ("MT"), massive MTC ("mMTC"), Maximum Power Reduction ("MPR"), Machine Type Communication ("MTC"), Multi User Shared Access ("MUSA"), AMF to MME Interface ("N26"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Proxy-Call Session Control Function ("P-CSCF"), P-Access-Network-Info ("PANI"), Power Angular Spectrum ("PAS"), Physical Broadcast Channel ("PBCH"), Power Control ("PC"), Primary Cell ("PCell"), Policy Control Function ("PCF"), Policy and Charging Rules Function ("PCRF"), Physical Cell ID ("PCID"), Physical Downlink Control Channel ("PDCCH"), Packet Data Convergence Protocol ("PDCP"), Packet Data Network ("PDN"), Physical Downlink Shared Channel ("PDSCH"), Pattern Division Multiple Access ("PDMA"), Packet Data Unit ("PDU"), Packet Data Network Gateway ("PGW"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Packet Switching ("PS"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Radio Resource Control ("RRC"), Resource Spread Multiple Access ("RSMA"), Reference Signal Received Power ("RSRP"), Round Trip Time ("RTT"), Receive ("RX"), Serving-Call Session Control Function ("S-CSCF"), Service Based Interface ("SBI"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Serving-Call Session Control Function ("S-CSCF"), Service Data Unit ("SDU"), System Information Block ("SIB"), Subscriber Identity/Identification Module ("SIM"), Signal-to-Interference-Plus-Noise Ratio ("SINR"), Service Level Agreement ("SLA"), Session Management Function ("SMF"), Short Message Service ("SMS"), Single Network Slice Selection Assistance Information ("S-NSSAI"), Synchronization Signal ("SS"), Synchronization Signal Block ("SSB"), Supplementary Uplink ("SUL"), Subscriber Permanent Identifier ("SUPI"), Terminating Access Domain Selection ("T-ADS"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), UDR Translation Function ("UTF"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a device may be registered with two networks. In such networks, information corresponding to the device may be difficult to maintain.

BRIEF SUMMARY

Methods for establishing a connection with a dual registered device are disclosed. Apparatuses and systems also perform the functions of the methods. One embodiment of a method includes receiving a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. In certain embodiments, the method includes determining first information corresponding to a network access connectivity selected from the first network access and the second network access through which the first device has internet protocol connectivity with the internet protocol multimedia subsystem. In some embodiments, the method includes transmitting a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

One apparatus for establishing a connection with a dual registered device includes a receiver that receives a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. In various embodiments, the apparatus includes a processor that determines first information corresponding to a network access connectivity selected from the first network access and the second network access through which the first device has internet protocol connectivity with the internet protocol multimedia subsystem. In certain embodiments, the apparatus includes a transmitter that transmits a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

Another embodiment of a method for retrieving information includes receiving a request at a first network function to retrieve information on voice support over an internet protocol multimedia subsystem over packet switched network from a first network access connectivity, wherein the request comprises information indicating a second network function to contact regarding the first network access connectivity of the first device.

Another apparatus for retrieving information includes a receiver that receives a request at a first network function to retrieve information on voice support over an internet protocol multimedia subsystem over packet switched network from a first network access connectivity, wherein the request comprises information indicating a second network function to contact regarding the first network access connectivity of the first device.

A further embodiment of a method for establishing a connection with a dual registered device includes receiving a first request indicating that a server is unavailable. In certain embodiments, the method includes determining first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access. In some embodiments, the method includes transmitting a second request to a first network function to initiate reconnection with the server, wherein the second request comprises second information indicating a second network function to contact to re-establish connection with the internet protocol multimedia subsystem.

A further apparatus for establishing a connection with a dual registered device includes a receiver that receives a first request indicating that a server is unavailable. In various embodiments, the apparatus includes a processor that determines first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access. In certain embodiments, the apparatus includes a transmitter that transmits a second request to a first network function to initiate reconnection with the server, wherein the second request comprises second information indicating a second network function to contact to re-establish connection with the internet protocol multimedia subsystem.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
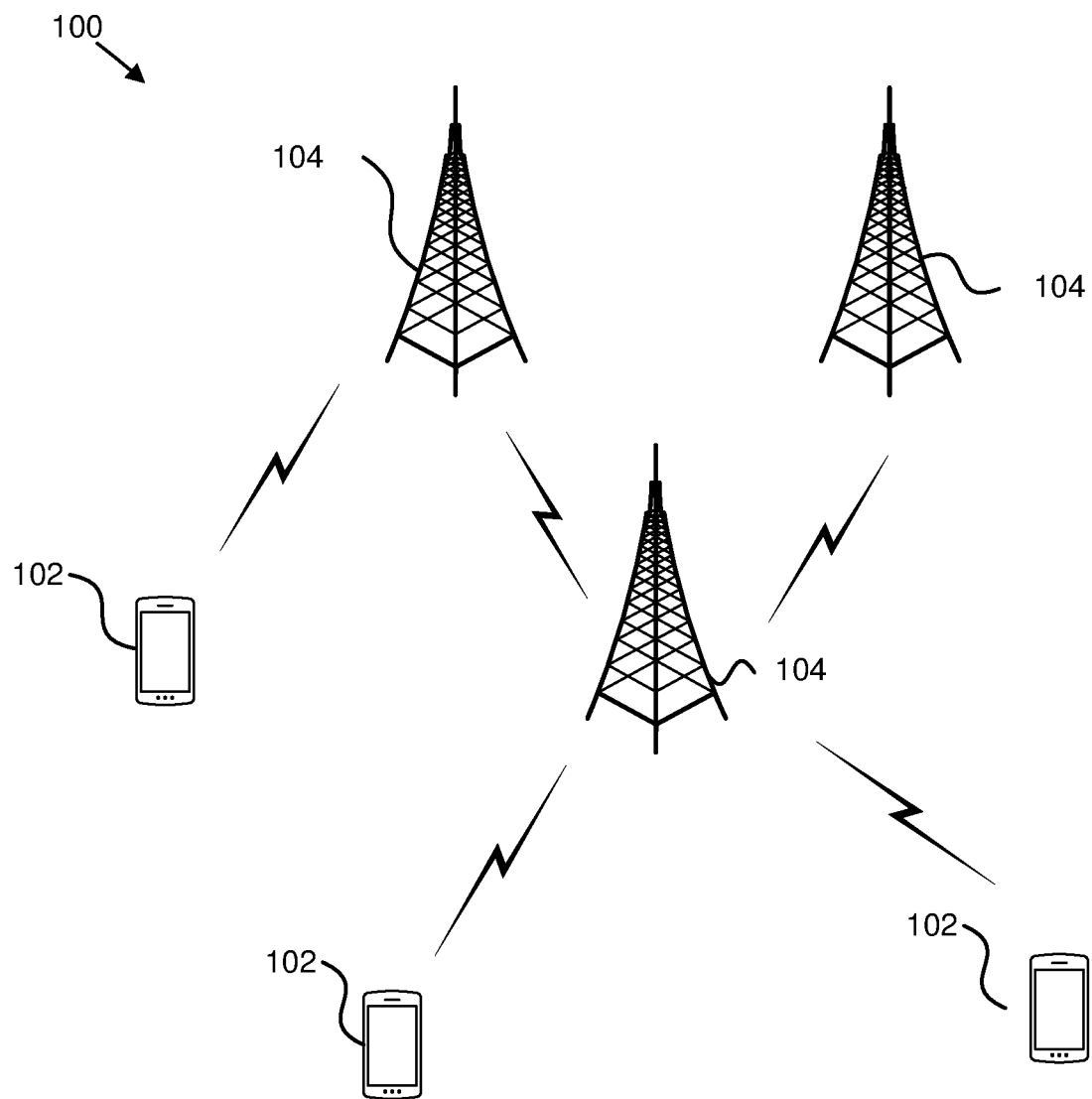
FIG. 1 is a schematic block diagram illustrating one embodiment of a wireless communication system for establishing a connection with a dual registered device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for establishing a connection with a dual registered device. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an HSS, a UTF, an MME, an IMS AS, an S-CSCF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a network unit 104 may receive a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. In certain embodiments, the network unit 104 may determine first information corresponding to a network access connectivity selected from the first network access and the second network access through which the first device has internet protocol connectivity with the internet protocol multimedia subsystem. In some embodiments, the network unit 104 may transmit a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information. Accordingly, the network unit 104 may be used for establishing a connection with a dual registered device.

In another embodiment, a network unit 104 may receive a request at a first network function to retrieve information on voice support over an internet protocol multimedia subsystem over packet switched network from a first network access connectivity, wherein the request comprises information indicating a second network function to contact regarding the first network access connectivity of the first device. Accordingly, the network unit 104 may be used for retrieving information.

In one embodiment, a network unit 104 may receive a first request indicating that a server is unavailable. In certain embodiments, the network unit 104 may determine first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access. In some embodiments, the network unit 104 may transmit a second request to a first network function to initiate reconnection with the server, wherein the second request comprises second information indicating a second network function to contact to re-establish connection with the internet protocol multimedia subsystem. Accordingly, the network unit 104 may be used for establishing a connection with a dual registered device.

Figure 2:
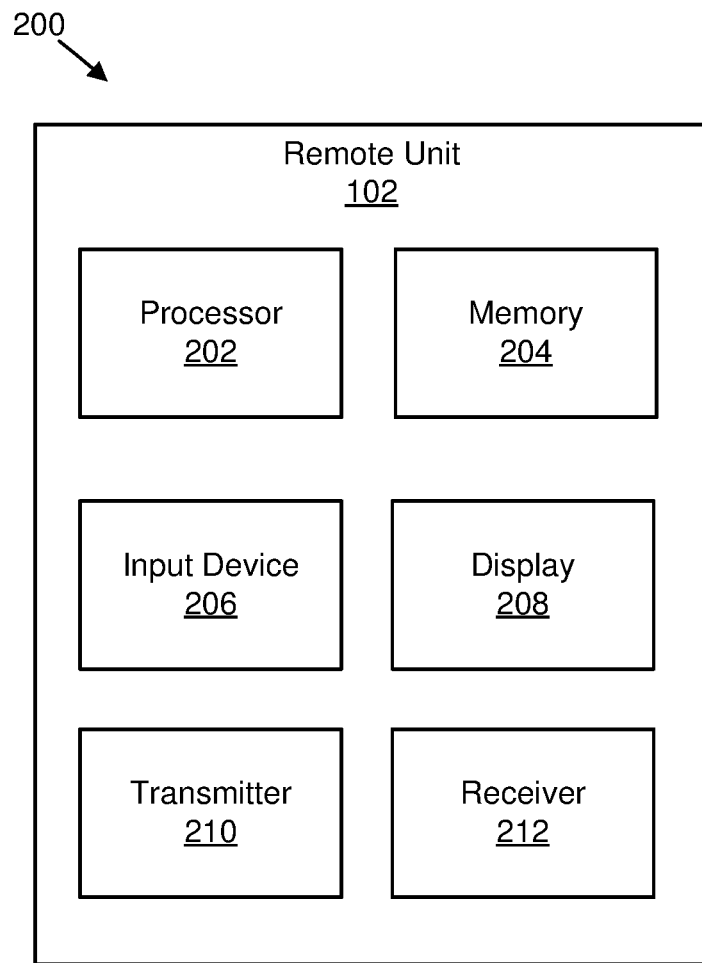
FIG. 2 is a schematic block diagram illustrating one embodiment of an apparatus that may be used for establishing a dual registration.

FIG. 2 depicts one embodiment of an apparatus 200 that may be used for establishing a dual registration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a configured network slice selection assistance information for a first mobile network for the apparatus in response to a change of the network slice selection policy; and use the configured network slice selection assistance information in the first mobile network. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
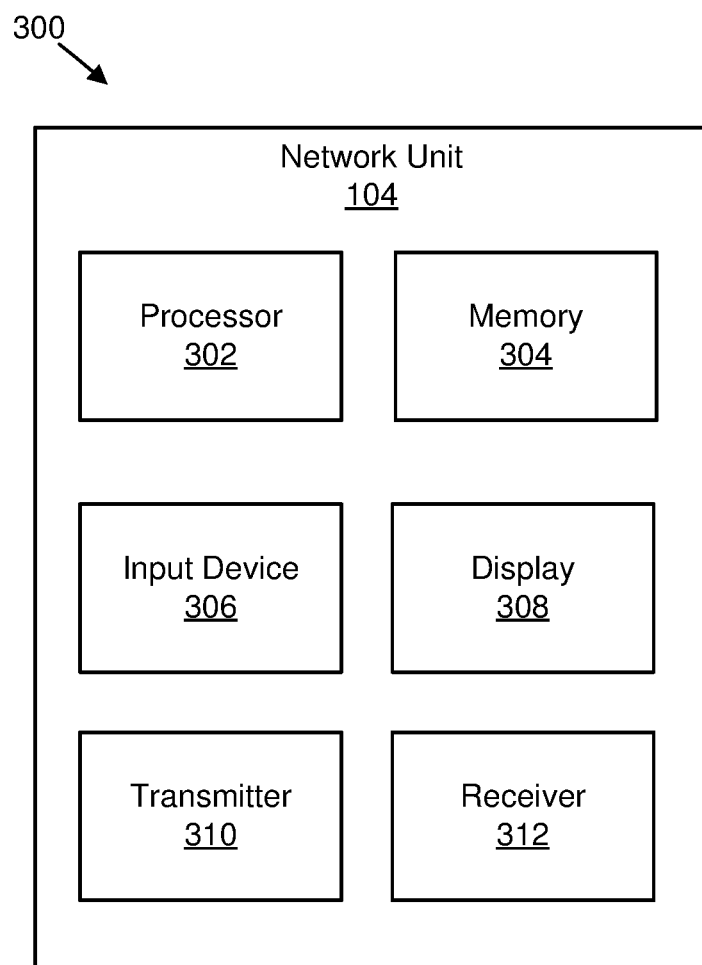
FIG. 3 is a schematic block diagram illustrating one embodiment of an apparatus that may be used for establishing a connection with a dual registered device.

FIG. 3 depicts one embodiment of an apparatus 300 that may be used for establishing a connection with a dual registered device. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

The receiver 312 may receive a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. The processor 302 may determine first information corresponding to a network access connectivity selected from the first network access and the second network access through which the first device has internet protocol connectivity with the internet protocol multimedia subsystem. The transmitter 310 may transmit a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

The receiver 312 may receive a request at a first network function to retrieve information on voice support over an internet protocol multimedia subsystem over packet switched network from a first network access connectivity, wherein the request comprises information indicating a second network function to contact regarding the first network access connectivity of the first device.

The receiver 312 may receive a first request indicating that a server is unavailable. In various embodiments, the processor 302 may determine first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access. In certain embodiments, the transmitter 310 may transmit a second request to a first network function to initiate reconnection with the server, wherein the second request comprises second information indicating a second network function to contact to re-establish connection with the internet protocol multimedia subsystem.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a UE (e.g., remote unit 102) may have and/or be in a dual registration mode (e.g., including networks that do not support N26 reference points). When the UE is in DR mode, the UE has simultaneous connections to an MME (e.g., in an EPS core network) and to an AMF (e.g., in a 5G core network). Accordingly, both the MME and the AMF hold UE context information for the UE.

In various embodiments, if a UE is in a DR mode, both an MME (e.g., in an EPS core network) and an AMF (e.g., in a 5G core network) provide an indication to the UE indicating that IMS over PS is supported. Both the MME and the AMF store the indication indicating that IMS over PS is supported (e.g., homogeneous support) and/or provide the indication indicating that IMS over PS is supported to an HSS and a UDM respectively. The UE uses the indication indicating that IMS over PS is supported to identify that IMS over PS is supported in accessing and/or establishing an IMS PS session.

In some embodiments, a UE in a DR mode may establish an IMS session over EPS or over 5G core. If an IMS AS requests from an HSS to receive T-ADS information, the HSS may not know for which access the UE has established an IMS connection because both the MME and the AMF may store information indicating that the UE supports IMS voice over PS. This may occur in systems in which a combined HSS/UDM is used or in systems that have separate HSS and UDM databases. In systems in which the HSS/UDM is combined, the system needs to identify whether the MME or the AMF needs to be queried for T-ADS information. In systems that have separate HSS and UDM databases, the HSS needs to determine if the MME or the UDM needs to be queried for T-ADS information.

In certain embodiments, if a P-CSCF fails a S-CSCF notifies an HSS to re-establish an IMS session. If a UE is dual registered, the HSS needs determine if it needs to notify an MME or an AMF (e.g., if the HSS and UDM are combined), or the MME or the UDM (e.g., if the HSS and UDM are separate) for a failure indication.

In various embodiments, a UTF allows subscription data exchange between a UDR of an HSS FE and a UDR of a UDM. The UTF may be a logical function that can be standalone or collocated with the UDM or HSS FE. In some embodiments, a UDR database of a UDM contains related 5G subscription data, and the UDR of a HSS FE contains related EPS and IMS subscription data.

In certain embodiments, a UTF contains a translation table that allows conversion of an Nudr (e.g., intra-PLMN interface) to a Ud (e.g., interface between PCRF and user data repositories) request and vice versa. If the UDM requires information from the EPS UDR, the UTF facilitates translation of a Nudr request to a Ud request. If the HSS FE requires information from the 5G UDR, the UTF is responsible to convert the Ud request to an Nudr request targeting specific subscription data. In various embodiments, a UTF implements a translation table supporting an HSS FE vendor specific Ud implementation.

In some embodiments, if an HSS FE or UDM determines that subscription data needs to be fetched from a different UDR, an Ud or Nudr message requesting subscription details may be sent to a UTF. The UTF translates the message into a corresponding message that is sent towards the HSS FE (e.g., Ud message) or the UDM (e.g., Nudr message) that is proxied towards the UDR. The UTF may also provide a translated message directly to a target UDR repository thereby bypassing the target HSS FE or the UDM.

Figure 4:
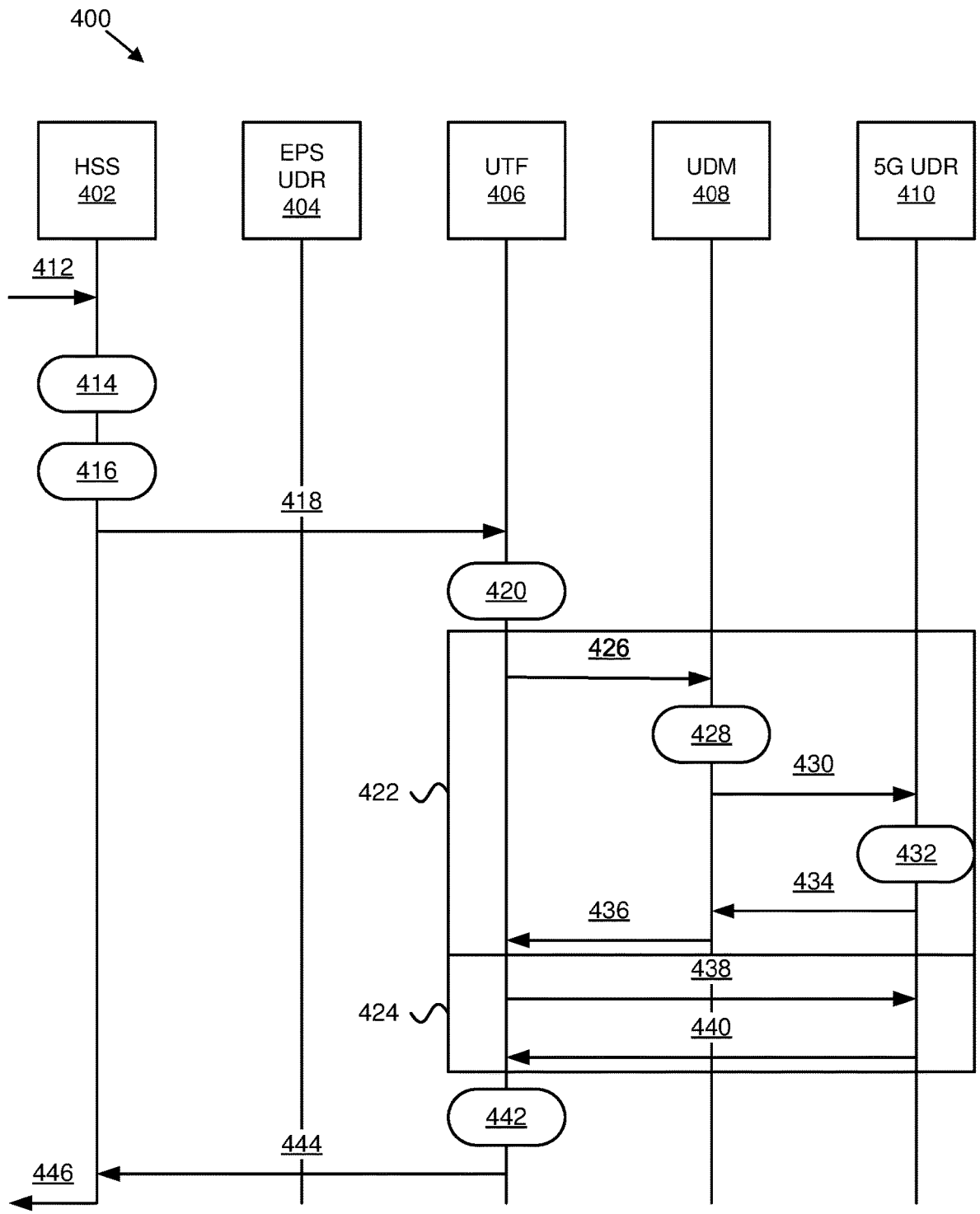
FIG. 4 is a schematic block diagram illustrating one embodiment of communications in a wireless communication system.

FIG. 4 is a schematic block diagram illustrating one embodiment of communications 400 in a wireless communication system. The communications 400 include messages transmitted between an HSS 402, an EPS UDR 404, a UTF 406, a UDM 408, and a 5G UDR 410. As may be appreciated, each communication described herein may include one or more messages.

In a first communication 412 transmitted to the HSS 402, the HSS 402 receives a subscription request. The HSS 402 identifies 414 subscription data on an external UDR. Further, the HSS 402 constructs 416 a Ud message to fetch the subscription data.

In a second communication 418 transmitted from the HSS 402 to the UTF 406, the HSS 402 transmits the Ud message to the UTF 406. The UTF 406 translates 420 the Ud message to an Nudr message.

The UTF 406 may perform either a first option 422, or a second option 424. In the first option 422, a third communication 426 is transmitted from the UTF 406 to the UDM 408. Specifically, the UTF 406 transmits the Nudr message to the UDM 408. The UDM 408 determines 428 a proxy Nudr message. In a fourth communication 430 transmitted from the UDM 408 to the 5G UDR 410, the UDM 408 transmits the proxy Nudr message to the 5G UDR 410. The 5G UDR fetches 432 the subscription data. In a fifth communication 434 transmitted from the 5G UDR 410 to the UDM 408, the 5G UDR 410 transmits an Nudr response to the UDM 408, and in a sixth communication 436 transmitted from the UDM 408 to the UTF 406, the UDM 408 transmits an Nudr response to the UTF 406.

In the second option 424, a seventh communication 438 is transmitted from the UTF 406 to the 5G UDR 410. Specifically, the UTF 406 transmits the Nudr message to the 5G UDR 410. In an eighth communication 440 transmitted from the 5G UDR 410 to the UTF 406, the 5G UDR 410 transmits an Nudr response to the UTF 406.

The UTF 406 translates 442 the Nudr message to a Ud message. In a ninth communication 444 transmitted from the UTF 406 to the HSS 402, the UTF 406 transmits a Ud response to the HSS 402. In a tenth communication 446 transmitted by the HSS 402, the HSS 402 transmits a subscription request response update location acknowledgment.

In certain embodiments, to support mobility in DR mode, support of an N26 interface between an AMF in 5GC and an MME in EPC is not required. A UE that supports a DR mode may operate in the DR mode if it receives an indication from a network that interworking without N26 is supported.

In some embodiments, for a UE operating in a DR mode the following may apply for PDU session transfer from 5GC to EPC: 1) the UE operating in the DR mode may register in EPC ahead of any PDU session transfer using an attach procedure indicating that the UE is moving from 5GC without establishing a PDN connection in EPC if the EPC supports EPS attach without PDN connectivity. Support for EPS attach without PDN connectivity may be mandatory for a UE supporting DR procedures. Before attempting early registration in EPC, the UE may check whether EPC supports EPS attach without PDN connectivity by reading a related SIB in a target cell; 2) the UE performs PDU session transfer from 5GC to EPC using a UE initiated PDN connection establishment procedure with a handover indication in the PDN connection request message; 3) if the UE has not registered with the EPC ahead of the PDU session transfer, the UE may perform attach in the EPC with a handover indication in the PDN connection request message; 4) the UE may selectively transfer certain PDU sessions to the EPC and keep other PDU sessions in 5GC; and 5) the UE may maintain a registration up to date in both 5GC and EPC by re-registering periodically in both systems. If the registration in either 5GC or EPC times out (e.g., upon a mobile unit reaching a timer expiration), the corresponding network may start an implicit detach timer. Whether the UE transfers some or all PDU sessions on the EPC and whether it maintains the registration up to date in both EPC and 5GC may depend on UE capabilities that are implementation dependent. The information for determining which PDU sessions are transferred on the EPC side and the triggers may be pre-configured in the UE.

In certain embodiments, for a UE operating in a DR mode the following may apply for a PDN connection transfer from EPC to 5GC: 1) the UE operating in the DR mode may register in a 5GC ahead of any PDN connection transfer using a registration procedure indicating that the UE is moving from the EPC; 2) the UE performs a PDN connection transfer from the EPC to the 5GC using a UE initiated PDU session establishment procedure with an existing PDU session indication; 3) the UE may selectively transfer certain PDN connections to the 5GC and keep other PDN connections in the EPC; and 4) the UE may maintain the registration up to date in both the EPC and the 5GC by re-registering periodically in both systems. If the registration in either the EPC or the 5GC times out (e.g. upon a mobile unit reaching a timer expiration), the corresponding network may start an implicit detach timer. Whether the UE transfers some or all PDN connections on the 5GC side and whether it maintains the registration up to date in both the 5GC and the EPC may depend on UE capabilities that are implementation dependent. The information for determining which PDN connections are transferred on the 5GC side and the triggers may be pre-configured in the UE. If the EPC does not support EPS attach without PDN connectivity, the MME may detach the UE if the last PDN connection is released by the PGW.

In various embodiments, if sending a control plane request for MT services (e.g., MT SMS) a network may route it via either the EPC or the 5GC. In the absence of a UE response, the network may attempt routing the control plane request via the other system. The choice of the system through which the network attempts to deliver the control plane request may be left to network configuration. In some embodiments, logic of which PDU sessions are kept in which system for a DR UE with selective transfer of certain PDU sessions may be left up to UE implementation. A voice centric UE may keep a PDU session used for IMS services with a system that supports voice over IMS. The voice centric UE may re-register with the IMS if the IMS PDU session is transferred between the 5GS and the EPS.

In certain embodiments, if a UE initiates IMS registration with an IMS network, the UE may include within a registration request a PANI header field that include information corresponding to a radio access technology type that the UE may be attached to for 3GPP access.

The radio access technology types that the UE indicates may include one or more of the following access-types: "3GPP-GERAN," "3GPP-UTRAN-FDD," "3GPP-UTRAN-TDD," "3GPP-E-UTRAN-FDD," "3GPP-E-UTRAN-TDD," "3GPP-E-UTRAN-ProSe-UNR," "3GPP-NR-FDD," "3GPP-NR-TDD," "3GPP2-1X," "3GPP2-1X-HRPD," "3GPP2-UMB," "3GPP2-1X-Femto," "IEEE-802.11," "IEEE-802.11a," "IEEE-802.11b," "IEEE-802.11g," "IEEE-802.11n," "ADSL," "ADSL2," "ADSL2+," "RADSL," "SDSL," "HDSL," "HDSL2," "G.SHDSL," "VDSL," "IDSL," "xDSL," "DOCSIS," "IEEE-802.3," "IEEE-802.3a," "IEEE-802.3e," "IEEE-802.3i," "IEEE-802.3j," "IEEE-802.3u," "IEEE-802.3ab," "IEEE-802.3ae," "IEEE-802.3ah," "IEEE-802.3ak," "IEEE-802.3aq," "IEEE-802.3an," "IEEE-802.3y," "IEEE-802.3z," and "DVB-RCS2."

In one embodiment, during an IMS registration process a P-CSCF adds the access-class within a PANI header. Adding the access-class may include adding information indicating a core network technology (e.g., 5GC or EPSC) based on input from a PCRF or PCF.

The access class may be included in a field and may include one or more of the following: "3GPP-GERAN," "3GPP-UTRAN," "3GPP-E-UTRAN," "3GPP-NR," "3GPP-WLAN," "3GPP-GAN," "3GPP-HSPA," "3GPP2," "untrusted-non-3GPP-VIRTUAL-EPC," "VIRTUAL-no-PS," and "WLAN-no-PS."

In certain embodiments, an access class of 3GPP-NR may indicate that a UE is accessing IMS via a 5GC; and, in some embodiments, an access class of 3GPP-E-UTRAN may indicate that the UE is accessing IMS via EPC.

In one embodiment, an access-type may be used by an IMS node to identify a core network and a radio access technology. The access type may be a combination of the core network and radio access technology such as 3GPP-5GC-E-UTRA used to identify a 5GC with E-UTRA radio access. The access type may be 3GPP-5GC-NR used to identify a 5GC with NR radio access.

In some embodiments, if a UE initiates an IMS registration procedure, an S-CSCF and an IMS AS may receive a PANI header so that both entities know if the UE is accessing IMS via 5GC or via EPC.

In various embodiments, a UE may provide its IMS capability (e.g., such as IMS voice capability) only via a core access network the UE intends to use for IMS registration. If the UE, in DR mode, intends to create a PDN connection for IMS over an EPS access, then the UE may not provide its IMS capability to an AMF at the time the UE sends a NAS registration request (e.g., either at initial registration or due to mobility). In such embodiments, the AMF may not check whether the network supports IMS supported features (e.g., such as IMS voice over PS) in a location of the UE and does not store related information in the AMF and a UDM.

In certain embodiments, if a UE, in DR mode, intends to create a PDU session for IMS over 5G access, then the UE may not provide its IMS capability (e.g., such as IMS voice capability) to an MME at initial attach NAS signaling or at tracking area update NAS signaling. In such embodiments, the MME may not check whether the network supports IMS supported features (e.g., such as IMS voice over PS and/or T-ADS information) in a location of the UE and does not store related information in the MME and an HSS.

As may be appreciated, only the MME or the AMF may include information for IMS supported features (e.g., such as IMS voice over PS support) for the UE. In one embodiment, instead of a UE providing an explicit IMS voice supported capability within an NAS message, the UE may disable its radio capabilities relating to IMS voice via EPS or NAS.

In some embodiments, an MME and/or an AMF uses information provided by a UE (e.g., IMS capability or updated radio capability) to determine if the MME and/or the AMF need to determine if IMS voice over a PS session is supported. If the UE provides its IMS voice capability via one access while in DR mode then either the MME and an HSS, or the AMF and an UDM may contain information about whether IMS voice over PS session is supported at the UE.

In various embodiments, if only an MME/HSS or an AMF/UDM have IMS voice over PS supported information, then if an IMS AS sends a request to the HSS (or HSS+UDM combination) requesting T-ADS information, the HSS may check its UDR to determine whether there is an IMS over PS supported indication available or it may interrogate the MME for the indication. If the HSS UDR or the MME does not have the IMS over PS supported indication, then the HSS may query the UDM (e.g., via a new interface or via the UTF), the HSS+UDM may query the UDR of the UDM, or the HSS may interrogate the AMF to obtain the information.

In certain embodiments, an IMS system entity (e.g., such as IMS AS) may not know whether to obtain information from an AMF or an MME because at the time the UE IMS registered to the IMS network, it may have used the E-UTRA related access-type in the PANI header (e.g., which may be used for both 5GC and EPC). In such embodiments, the IMS system entities (e.g., such as IMS AS) may check in both the AMF and the MME for the information relating to IMS supported features and/or T-ADS information (e.g., such as IMS voice over PS support for the UE). If the UE has, at the time of IMS registration, used an NR related access-type in the PANI header that may only be used for 5GC, the IMS system entities (e.g., such as IMS AS) may check the AMF for the information for IMS supported features for the UE.

In some embodiments, an IMS AS may know how a UE is accessing the IMS network if the IMS AS request for T-ADS information is in a request. The request may include which core network (e.g., EPC or 5GC) may provide related information (e.g., IMS voice over PS support indication, current RAT type and last radio contact).

In certain embodiments, an IMS AS may include, in a Sh request, Requested-Nodes AVP that includes information about which node (e.g., MME and/or AMF) information is requested from. The Requested-Nodes AVP may be of a type Unsigned32 and may comprise a bit mask according to Table 1.

TABLE 1

| Bit | Name | Description |
| --- | --- | --- |
| 0 | MME | The requested data applies to the MME |
| 1 | SGSN | The requested data applies to the SGSN |
| 2 | 3GPP-AAA-SERVER-TWAN | The requested data applies to the 3GPP AAA Server for TWAN |
| 3 | AMF | The requested data applies to the AMF (for 3GPP access) |

In various embodiments, if a 3GPP subscription database node (e.g., HSS) receives a request from an IMS AS (e.g., requesting T-ADS information), the 3GPP node may check a Requested-Nodes AVP to determine if information is requested from a 5G subscription and/or an EPS subscription.

In some embodiments, if an operator implements a separate HSS and UDM and the HSS supports IMS subscription only and if the HSS receives a request from an IMS AS and identifies that the IMS AS is requesting T-ADS information from an AMF (e.g., because the request is set to the AMF), the HSS may be aware that the information may be available from the UDR database of the UDM. In such embodiments, the HSS either may proxy the Sh message to the UDM or request from the UDR of the UDM (e.g., via the UTF) for the T-ADS information, as illustrated in FIG. 5.

Figure 5:
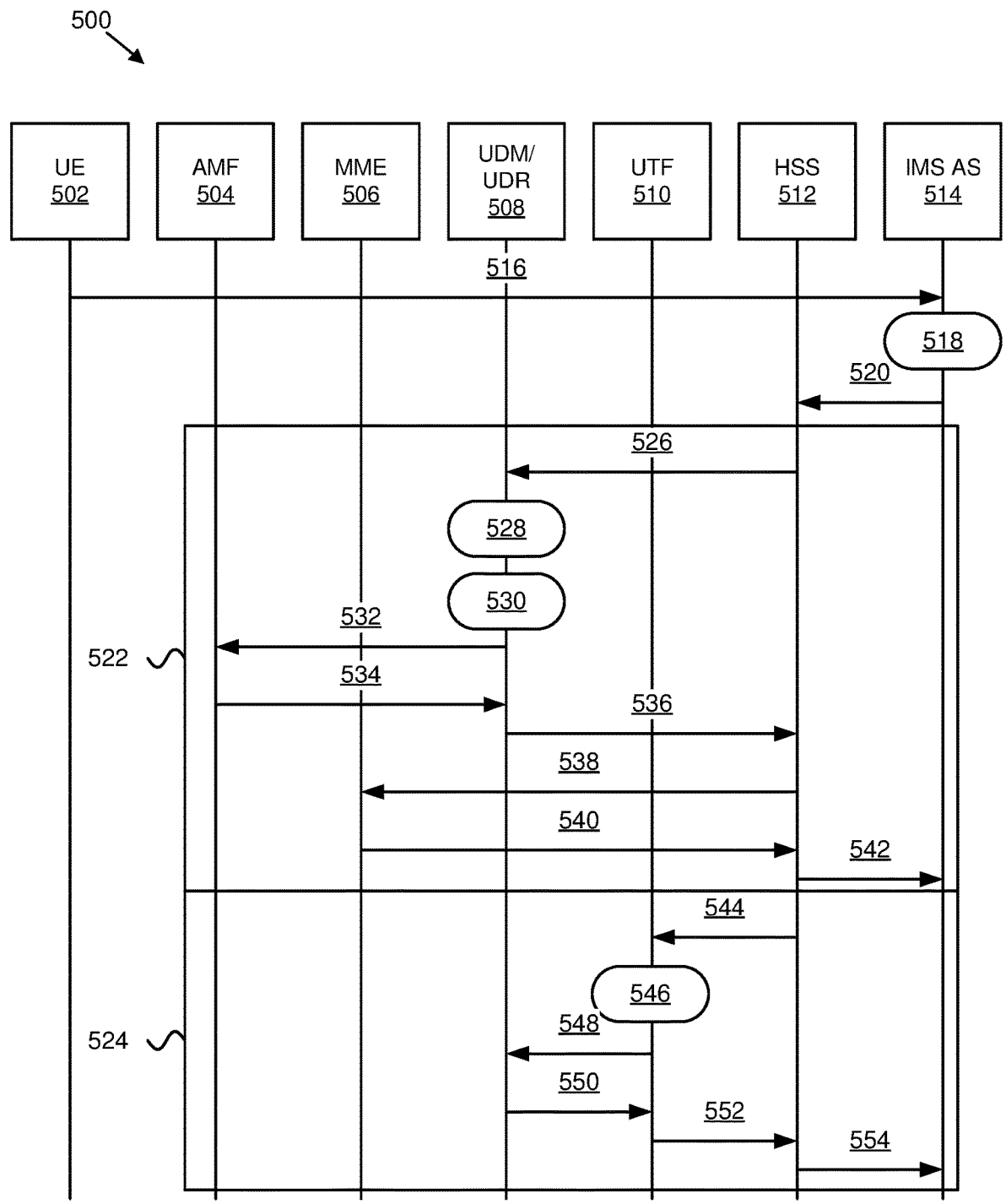
FIG. 5 is a schematic block diagram illustrating another embodiment of communications in a wireless communication system.

FIG. 5 is a schematic block diagram illustrating another embodiment of communications 500 in a wireless communication system. The communications 500 include messages transmitted between a UE 502, an AMF 504, an MME 506, a UDM/UDR 508, a UTF 510, an HSS 512, and an IMS AS 514. As may be appreciated, each communication described herein may include one or more messages.

In a first communication 516 transmitted from the UE 502 to the IMS AS 514, the UE 502 may IMS register with an IMS network by including an access-type in a PANI header. In one embodiment, the content of the access-type in the PANI header may include information indicating a core network technology used (e.g., 5GC or EPC). In some embodiments, a P-CSCF may include an access-class that may further include information indicating a core network technology based on input from a PCRF or a PCF. The IMS AS 514 may receive the PANI header using any suitable method.

The IMS AS 514 may derive 518 from the PANI header the type of the core network the UE is connected to (e.g., EPS network or 5G network) by the content of the access-type field and/or access-class field of the PANI header.

In a second communication 520 transmitted from the IMS AS 514 to the HSS 512, if the IMS AS 514 determines that it needs to obtain T-ADS information, the IMS AS 514 may send a request via an Sh interface to obtain the most recent T-ADS information from the HSS 512. The IMS AS 514 may include the Requested-Nodes AVP including information about a node that the information is requested from. If the IMS AS 514 determines that the UE 502 is accessing the IMS via a 5G network, the IMS AS 514 may include in the Requested-Nodes AVP a bit mask 3 (e.g., indicating that the requested data applies to the AMF 504). If the IMS AS 514 determines that the UE 502 is accessing the IMS via EPS, the IMS AS 514 may include in the Requested-Nodes AVP a bit mask 0 (e.g., indicating that the requested data applies to the MME 506).

The HSS 512 may perform either a first option 522 (e.g., using a direct interface between the UDM/UDR 508 and the HSS 512 with a new reference point between the UDM/UDR 508 and the HSS 512; however, in some embodiments, the HSS 512 may proxy the Sh request to the UDM/UDR 508), or a second option 524 (e.g., using the UTF 510 between the HSS 512 and the UDM/UDR 508 with no direct reference point between the HSS 512 and the UDM/UDR 508). In the first option 522, in a third communication 526 transmitted from the HSS 512 to the UDM/UDR 508, if the HSS 512 determines that the most recent T-ADS information is located in the AMF 504 (e.g., based on the Requested-Node AVP), then the HSS 512 queries the UDM/UDR 508 to obtain the information. The HSS 512 may proxy the Sh request to the UDM/UDR 508 or may create a new request based on a new reference point between the HSS 512 and the UDM/UDR 508.

The UDM/UDR 508 may check 528 with the UDR (e.g., via an Nudr message) to obtain the T-ADS information If the UDM/UDR 508 identifies 530 from the UDR that an IMS Voice over PS support indication is not homogeneous, the UDM/UDR 508 may query the AMF 504 for the latest information In a fourth communication 532 transmitted from the UDM/UDR 508 to the AMF 504, the UDM/UDR 508 may send an Namf_MT_ProvideDomainSelectionInfo service request to the AMF 504. In a fifth communication 534 transmitted from the AMF 504 to the UDM/UDR 508, the AMF 504 may provide the information to the UDM/UDR 508 in a response to the Namf_MT_ProvideDomainSelectionInfo service request.

In a sixth communication 536 transmitted from the UDM/UDR 508 to the HSS 512, the UDM/UDR 508 may send the information to the HSS 512 via a new interface or via an Sh reference point.

In a seventh communication 538 transmitted from the HSS 512 to the MME 506, if the HSS 512 determines that the information requested is from the MME 506 the HSS 512 may query the MME 506 to obtain the most recent domain selection information (e.g., T-ADS information). In an eighth communication 540 transmitted from the MME 506 to the HSS 512, the MME 506 may send the T-ADS information to the HSS 512. In a ninth communication 542 transmitted from the HSS 512 to the IMS AS 514, the HSS 512 may provide the information to the IMS AS 514 via an Sh reference point.

In the second option 524, in a tenth communication 544 transmitted from the HSS 512 to the UTF 510, if the HSS 512 determines that the information requested is from the AMF 504 (e.g., based on the Requested-Node AVP) the HSS 512 determines that it may need to query the UDR of the UDM/UDR 508 to obtain the information. The HSS 512 may construct a Ud message to retrieve the T-ADS information and may send the Ud message to the UTF 510.

The UTF 510 may translate 546 the request into an Nudr request. In an eleventh communication 548 transmitted from the UTF 510 to the UDM/UDR 508, the UTF 510 may send the Nudr request towards the UDR of the UDM/UDR 508. In a twelfth communication 550 transmitted from the UDM/UDR 508 to the UTF 510, the UDR of the UDM/UDR 508 may provide the T-ADS information in a Nudr response to the UTF 510.

In a thirteenth communication 552 transmitted from the UTF 510 to the HSS 512, the UTF 510 may translate the Nudr response into an Ud response that is transmitted to the HSS 512. In a fourteenth communication 554 transmitted from the HSS 512 to the IMS AS 514, the HSS 512 may send the T-ADS information to the IMS AS 514 via a Sh reference point. It should be noted that if the HSS 512 determines that the information requested is from the MME 506, then communications 538 and 540 may take place instead.

In certain embodiments, if an operator implements a combo HSS+UDM then if the HSS+UDM receives a request from an IMS AS and identifies that the IMS AS is requesting T-ADS information and that the requested node is MME, the HSS+UDM may obtain the information from the MME.

Figure 6:
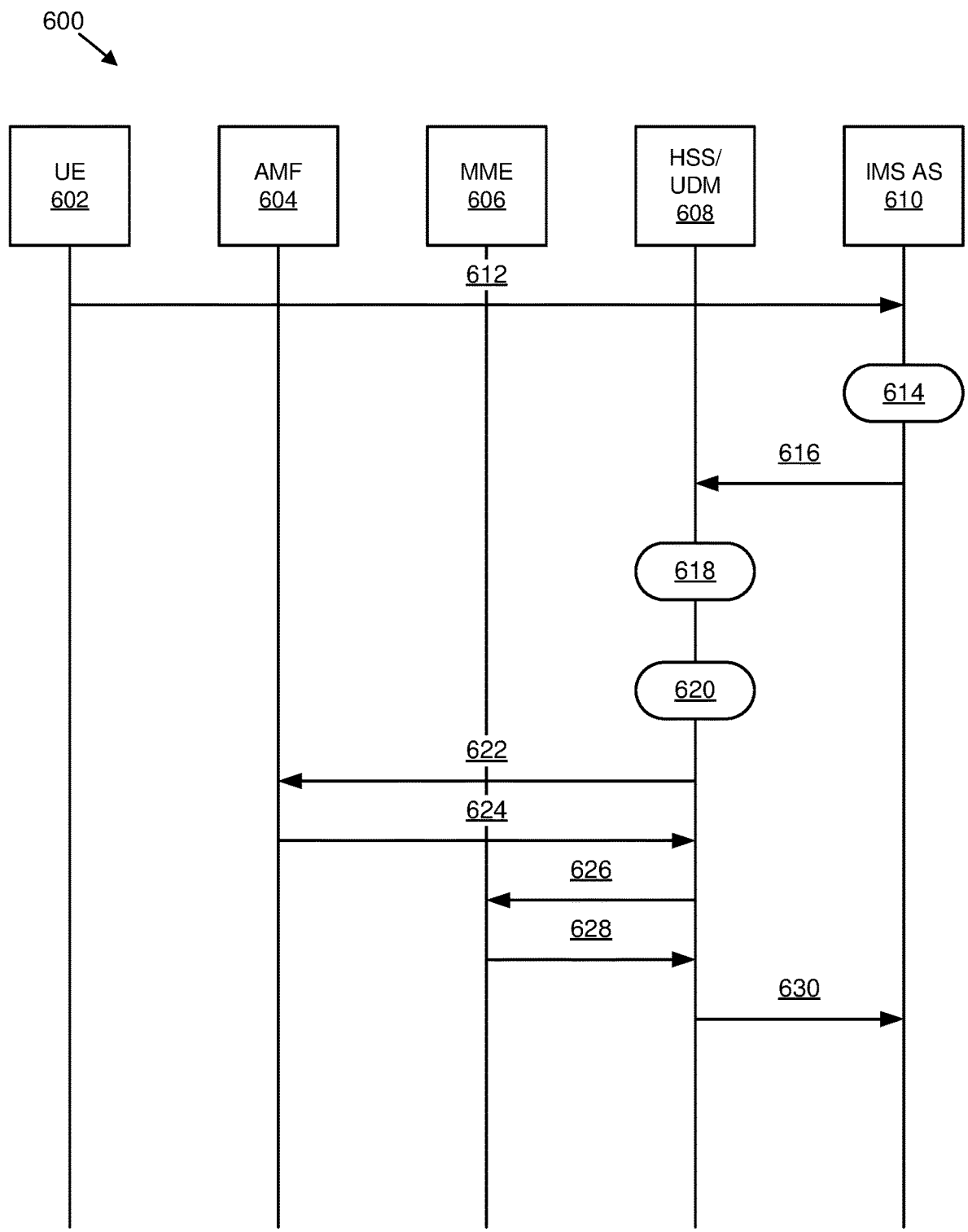
FIG. 6 is a schematic block diagram illustrating an additional embodiment of communications in a wireless communication system.

FIG. 6 is a schematic block diagram illustrating an additional embodiment of communications 600 in a wireless communication system. The communications 600 include messages transmitted between a UE 602, an AMF 604, an MME 606, an HSS/UDM 608, and an IMS AS 610. As may be appreciated, each communication described herein may include one or more messages.

In a first communication 612 transmitted from the UE 602 to the IMS AS 610, the UE 602 may IMS register with an IMS network by including an access-type in a PANI header. In one embodiment, the content of the access-type in the PANI header may include information indicating a core network technology used (e.g., 5GC or EPC). In some embodiments, a P-CSCF may include an access-class that may further include information indicating a core network technology based on input from a PCRF or a PCF. The IMS AS 610 may receive the PANI header using any suitable method.

The IMS AS 610 may derive 614 from the PANI header the type of the core network the UE is connected to (e.g., EPS network or 5G network) by the content of the access-type field and/or access-class field of the PANI header.

In a second communication 616 transmitted from the IMS AS 610 to the HSS/UDM 608, if the IMS AS 610 determines that it needs to obtain T-ADS information, the IMS AS 610 may send a request via an Sh interface to obtain the most recent T-ADS information from the HSS/UDM 608. The IMS AS 610 may include in the Requested-Nodes AVP including information about a node that the information is requested from. If the IMS AS 610 determines that the UE 602 is accessing IMS via 5G network, the IMS AS 610 may include in the Requested-Nodes AVP a bit mask 3 (e.g., indicating that the requested data applies to the AMF 604). If the IMS AS 610 determines that the UE 602 is accessing the IMS via EPS, the IMS AS 610 may include in the Requested-Nodes AVP a bit mask 0 (e.g., indicating that the requested data applies to the MME 606).

The HSS/UDM 608 may check 618 with the UDR (via an Nudr message) to obtain the T-ADS information.

In a first option, the UE 602 may access the IMS via 5GC. In this first option, if the HSS/UDM 608 identifies 620 from the UDR that IMS voice over PS support indication is not homogeneous and the UE 602 may access the IMS via 5GC, then the HSS/UDM 608 may query the AMF 604 for the latest information. In a third communication 622 transmitted from the HSS/UDM 608 to the AMF 604, the HSS/UDM 608 may send an Namf_MT_ProvideDomainSelectionInfo service request to the AMF 604. In a fourth communication 624 transmitted from the AMF 604 to the HSS/UDM 608, the AMF 604 may provide the information to the HSS/UDM 608 in a response to the Namf_MT_ProvideDomainSelectionInfo service request.

In a second option, the UE 602 is accessing the IMS via EPC. In this second option, if the HSS/UDM 608 identifies from the UDR that IMS voice over PS support indication is not homogeneous and if the UE 602 is accessing IMS via EPC, then in a fifth communication 626 transmitted from the HSS/UDM 608 to the MME 606, the HSS/UDM 608 may query the MME 606 to obtain the most recent domain selection information (e.g., T-ADS information). In a sixth communication 628 transmitted from the MME 606 to the HSS/UDM 608, the MME 606 may provide a response to the request for the T-ADS information.

In a seventh communication 630 transmitted from the HSS/UDM 608 to the IMS AS 610, the HSS/UDM 608 may provide the information to the IMS AS 610 via an Sh reference point.

In certain embodiments, the IMS AS 610 may have separate interfaces with the HSS (e.g., via Sh) and with the UDM (e.g., via a new reference point based on SBI). In such embodiments, the IMS AS 610 derives the access via which the UE 602 is connected to the IMS based on the information included within the PANI header and interrogates the HSS (e.g., via Sh) or the UDM (e.g., via SBI reference point) for T-ADS information.

Figure 7:
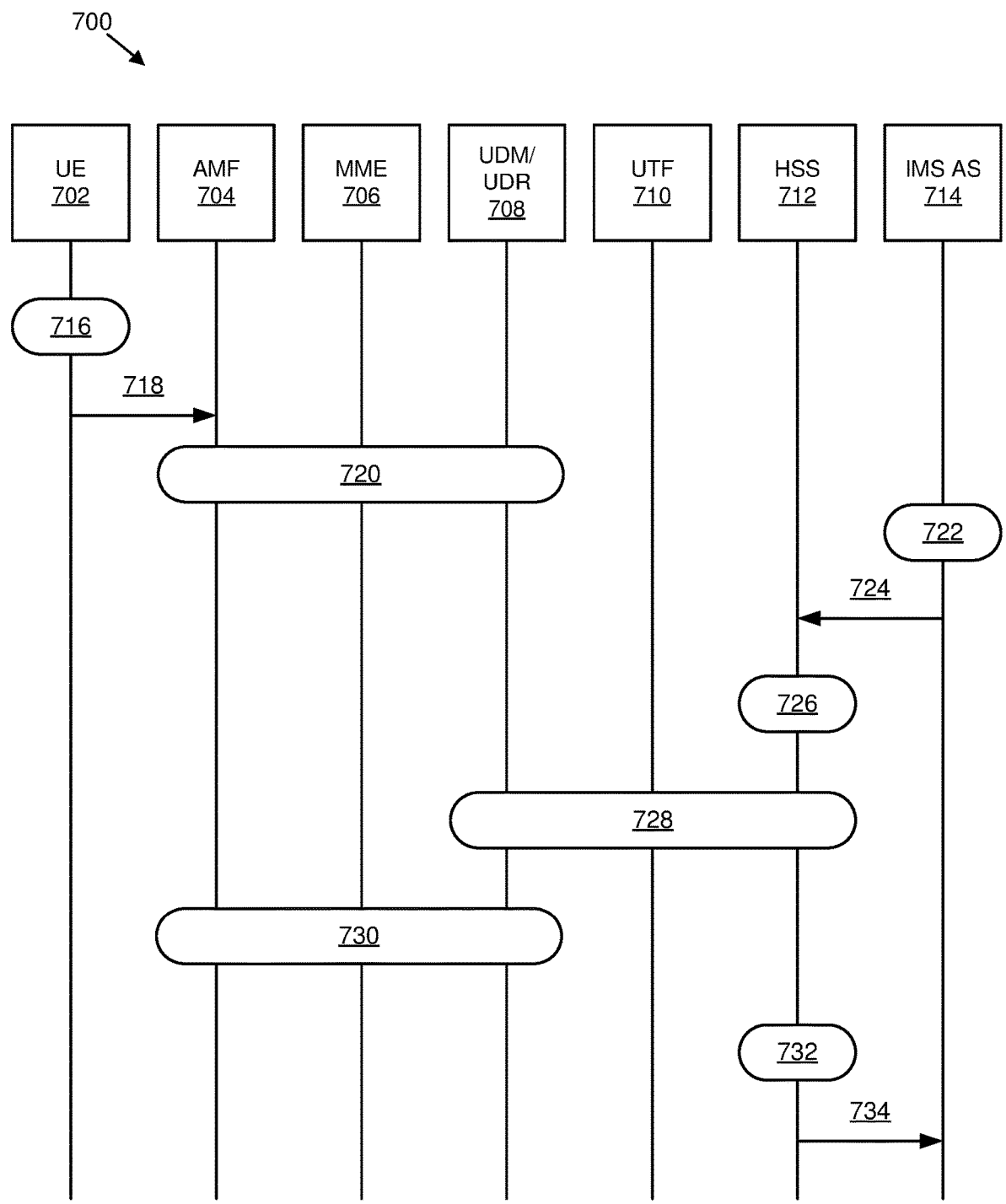
FIG. 7 is a schematic block diagram illustrating a further embodiment of communications in a wireless communication system.

In an embodiment illustrated in FIG. 7, the network may support separate HSS and UDM and, if the UE is DR to both EPS and 5GS, may use EPS for an IMS service such as IMS voice.

FIG. 7 is a schematic block diagram illustrating a further embodiment of communications 700 in a wireless communication system. The communications 700 include messages transmitted between a UE 702, an AMF 704, an MME 706, a UDM/UDR 708, a UTF 710, an HSS 712, and an IMS AS 714. As may be appreciated, each communication described herein may include one or more messages.

The UE 702 may be 716 DR to both EPS and 5GS and may use EPS for an IMS service, such as IMS voice.

In a first communication 718 transmitted from the UE 702 to the AMF 704, the UE 702 may initiate a 5GS registration update with the AMF 704 indicating that IMS capability (e.g., such as IMS voice) is not supported. The UE 702 may not include its IMS capability (e.g., such as IMS voice capability) in the 5GS registration message request.

The AMF 704 determines 720 that the UE 702 does not support IMS capability (e.g., such as IMS voice over PS) and does not derive whether the network IMS voice is over PS in the location of the UE 702. The AMF 704 does not store an IMS voice over PS support indication and other T-ADS information for this UE 702 in the UDM/UDR 708.

If the IMS AS 714 requires 722 T-ADS information, the IMS AS 714 may not know whether to obtain this information from the AMF 704 or the MME 706. In one embodiment, a reason may be that at the time the UE 702 IMS registered to the IMS network, the UE 702 used an E-UTRA related access-type which can be used for both 5GC and EPC. Therefore, the IMS AS 714 may check for the T-ADS information in both the AMF 704 and the MME 706.

In a second communication 724 transmitted from the IMS AS 714 to the HSS 712, the IMS AS 714 may request T-ADS information from the HSS 712 via a Sh reference point.

The HSS 712 may check 726 its UDR to obtain T-ADS information or may interrogate the MME 706.

The HSS 712 may also interrogate 728 the UDM/UDR 708 for T-ADS information, and the UDM/UDR 708 may interrogate 730 the AMF 704 for T-ADS information.

The HSS 712 identifies 732 that T-ADS information may only be available over EPS.

In a third communication 734 transmitted from the HSS 712 to the IMS AS 714, the HSS 712 may provide the information to the IMS AS 714.

In certain embodiments, if a network supports a combo HSS+UDM then the HSS+UDM may interrogate the MME and the AMF in order to obtain the T-ADS information (only either the MME or the AMF may respond with T-ADS information).

Figure 8:
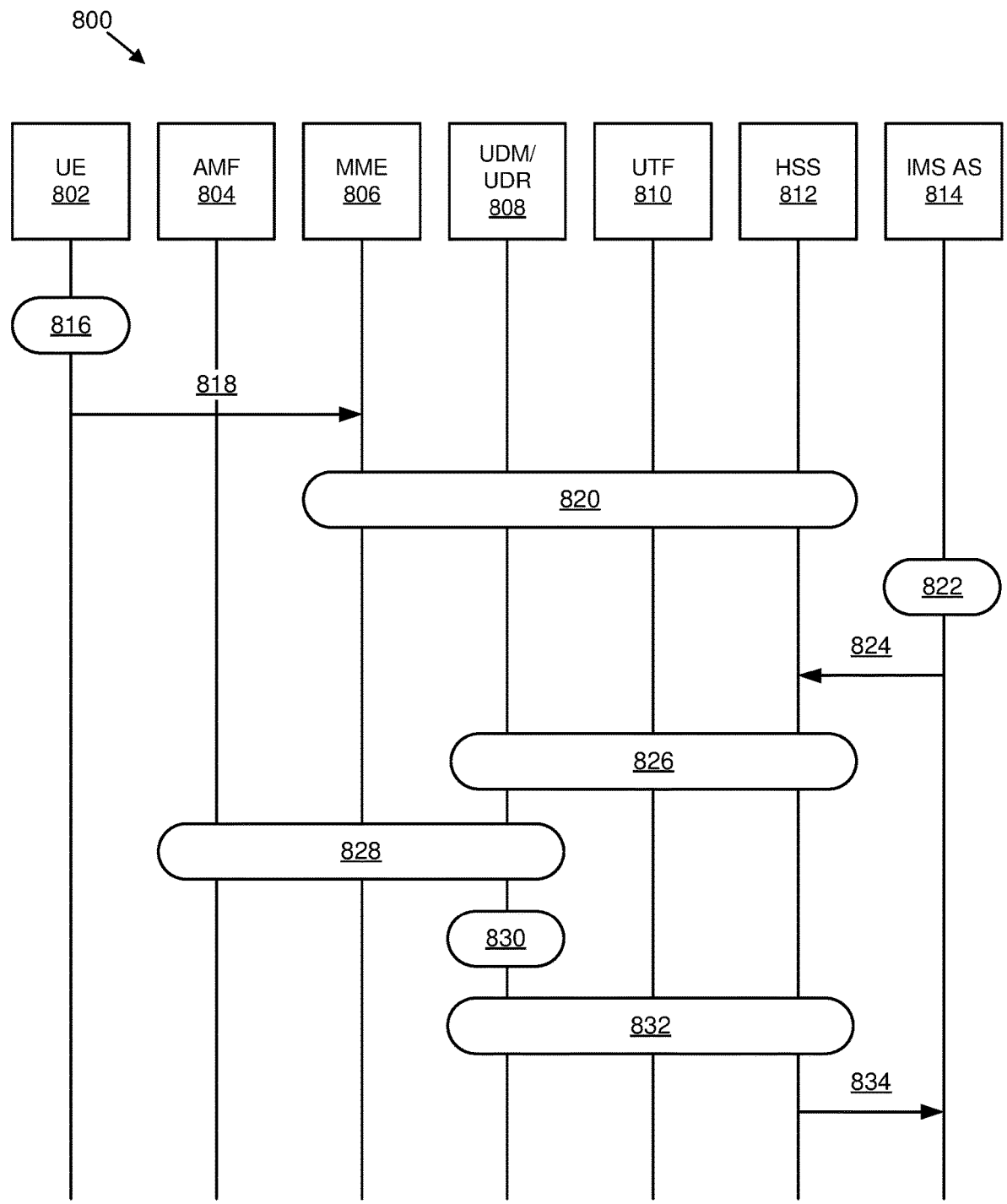
FIG. 8 is a flow chart diagram illustrating yet another embodiment of communications in a wireless communication system.

FIG. 8 illustrates one embodiment in which a network may support a separate HSS and UDM, and the UE may be DR to both EPS and 5GS and may use 5GS for an IMS service such as IMS voice.

FIG. 8 is a flow chart diagram illustrating yet another embodiment of communications 800 in a wireless communication system. The communications 800 include messages transmitted between a UE 802, an AMF 804, an MME 806, a UDM/UDR 808, a UTF 810, an HSS 812, and an IMS AS 814. As may be appreciated, each communication described herein may include one or more messages.

The UE 802 may be 816 DR to both EPS and 5GS and may use EPS for an IMS service, such as IMS voice.

In a first communication 818 transmitted from the UE 802 to the MME 806, the UE 802 may initiate a tracking area update (or an initial attach) with the MME 806. The UE 802 may indicate that it does not support IMS capabilities (e.g., such as IMS voice capability over EPS access) by not including an indication within a request that IMS capabilities (e.g., such as IMS voice over PS) is supported.

The MME 806 determines 820 that the UE 802 does not support IMS capability (e.g., such as IMS voice over PS) and does not derive whether the network IMS voice is over PS in the location of the UE 802. The MME 806 does not store an IMS voice over PS support indication and other T-ADS information for this UE 802 in the HSS 812.

The IMS AS 814 identifies 822 that T-ADS information is required for domain selection. If the IMS AS 814 requires T-ADS information, the IMS AS 814 may know to obtain this information from the AMF 804 or the MME 806. In one embodiment, a reason may be that at the time the UE 802 IMS registered to the IMS network, the UE 802 used an NR related access-type which can be used for 5GC.

In a second communication 824 transmitted from the IMS AS 814 to the HSS 812, the IMS AS 814 may request T-ADS information from the HSS 812 via a Sh reference point.

The HSS 812 may also interrogate 826 the UDM/UDR 808 that may interrogate 828 the AMF 804 for T-ADS information.

The UDM/UDR 808 may obtain 830 T-ADS information from a 5GS subscription or the AMF 804.

The HSS 812 identifies 832 T-ADS information from a 5GS subscription.

In a third communication 834 transmitted from the HSS 812 to the IMS AS 814, the HSS 812 may provide the information to the IMS AS 814.

In certain embodiments, if the network supports a combo HSS+UDM then the HSS+UDM may interrogate the AMF to obtain the T-ADS information.

In some embodiments, if an S-CSCF determines that a P-CSCF is unavailable, the S-CSCF may trigger an HSS to re-establish a PDN connection associated with an IMS. The S-CSCF triggers the HSS to re-establish the PDN connection associated with IMS via a Cx reference point. The HSS then instructs the MME to re-establish the PDN connection used for IMS via a S6a reference point.

If a UE is DR to EPS and 5GS, the UE may either have a PDN connection for IMS over EPS or a have a PDU session for IMS over 5GS.

In one embodiment, an S-CSCF may determine an access technology via which an IMS session is established by examining a PANI header. In such embodiments, the S-CSCF may indicate to the HSS via a Cx reference point the node (e.g., MME or AMF) that needs to be triggered to re-establish the IMS connection by including a Requested-Nodes AVP in the request.

Figure 9:
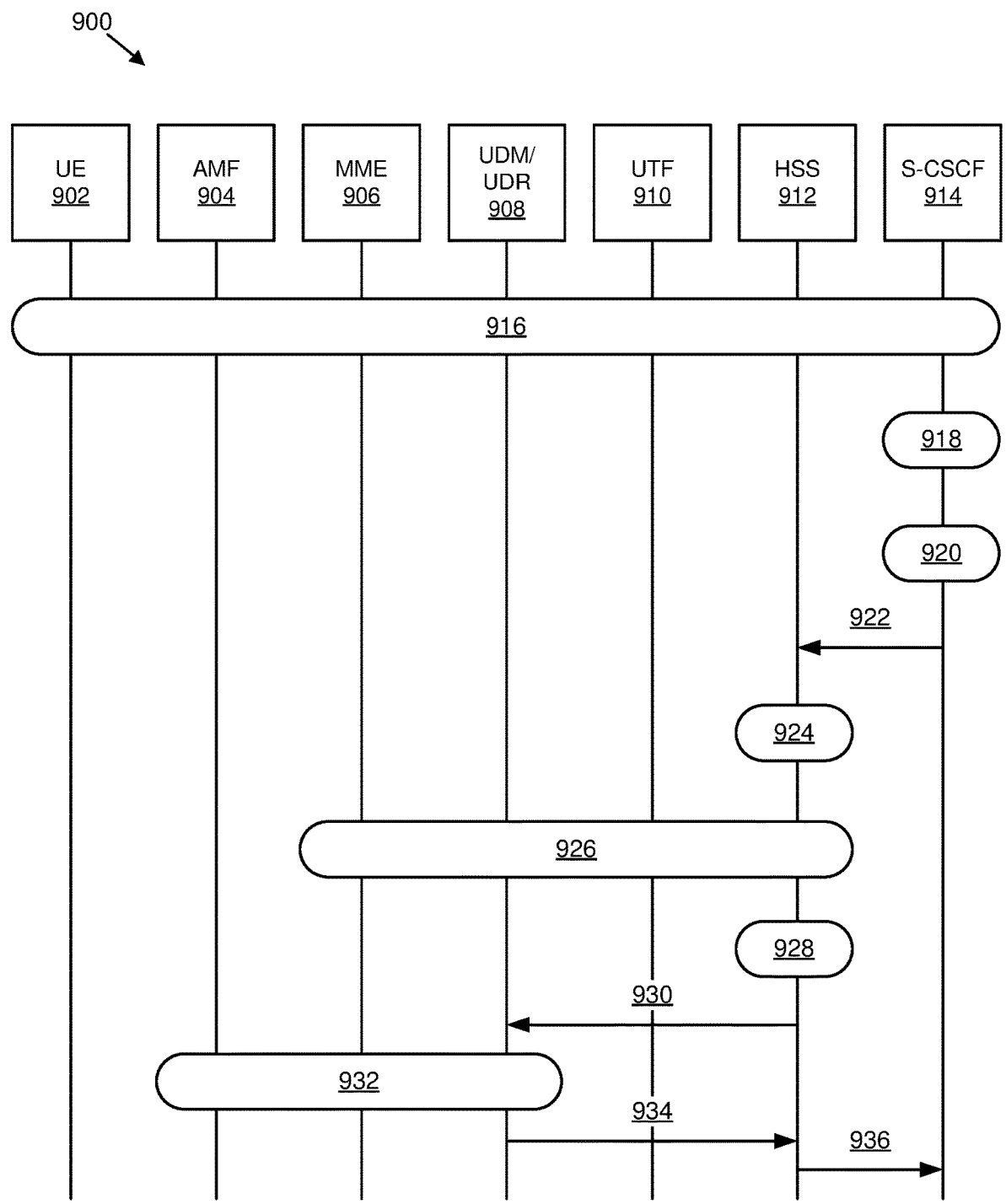
FIG. 9 is a flow chart diagram illustrating yet an additional embodiment of communications in a wireless communication system.

If a network supports a separate HSS and UDM architecture, the HSS may use the information provided within a Cx request to identify if the HSS triggers the MME or if it notifies the UDM to trigger the AMF as illustrated in FIG. 9.

FIG. 9 is a flow chart diagram illustrating yet an additional embodiment of communications 900 in a wireless communication system. The communications 900 include messages transmitted between a UE 902, an AMF 904, an MME 906, a UDM/UDR 908, a UTF 910, an HSS 912, and an S-CSCF 914. As may be appreciated, each communication described herein may include one or more messages.

The UE 902 may be registered 916 via IMS to either EPS or 5GS while operating in a DR mode (e.g., connected to both EPS and 5GS).

The S-CSCF 914 may identify 918 an access technology via which the UE 902 is IMS registered based on a PANI header.

The S-CSCF 914 may detect 920 a P-CSCF failure.

In a first communication 922 transmitted from the S-CSCF 914 to the HSS 912, the S-CSCF 914 may send via a Cx reference point to the HSS 912 an indication for P-CSCF restoration. The S-CSCF 914 may also include information indicating the access technology via which the UE 902 is IMS registered. In one embodiment, the information indicating the access technology may include a Requested-Nodes AVP within the Cx request.

If the access-type and/or access-class in the PANI header identifies the IMS network that the UE 902 is IMS registered over as EPS, the HSS 912 may identify 924 that the MME 906 may need to be triggered.

The HSS 912 may initiate 926 a P-CSCF restoration indication via a transmission to the MME 906.

If the access-type and/or access-class in the PANI header identifies the IMS network that the UE 902 is IMS registered over as 5GS, the HSS 912 may identify 928 that the UDM/UDR 908 may need to be notified.

In a second communication 930 transmitted from the HSS 912 to the UDM/UDR 908, the HSS 912 may proxy a Cx request to the UDM/UDR 908. In one embodiment, the HSS 912 may notify the UDM/UDR 908 via a new interface.

The UDM/UDR 908 may notify 932 the AMF 934 of a P-CSCF restoration indication.

In a third communication 934 transmitted from the UDM/UDR 908 to the HSS 912, the UDM/UDR 908 may transmit an acknowledgement to the HSS 912. In a fourth communication 936 transmitted from the HSS 912 to the S-CSCF 914, the HSS 912 may transmit an acknowledgment to the S-CSCF 914.

Figure 10:
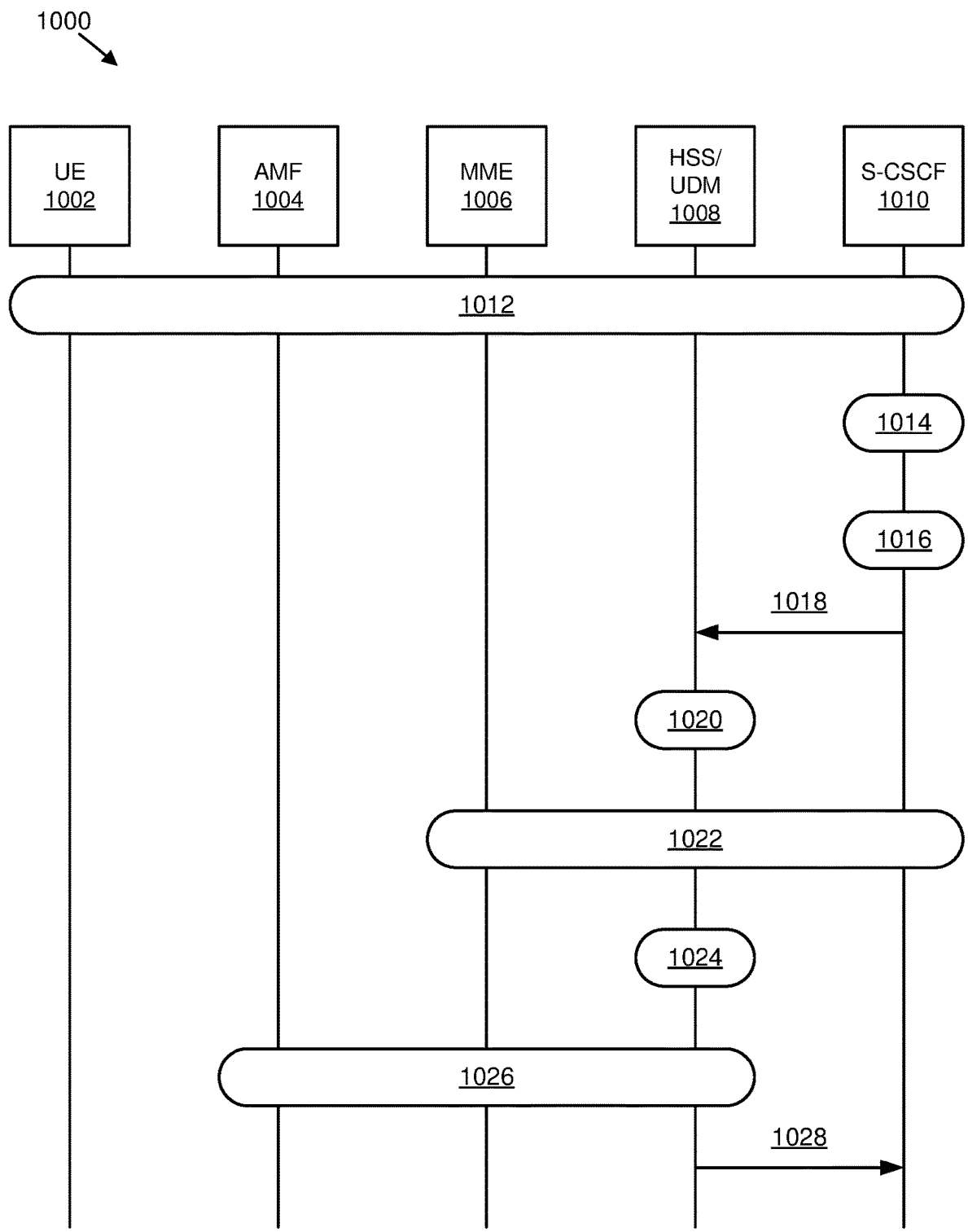
FIG. 10 is a flow chart diagram illustrating yet a further embodiment of communications in a wireless communication system.

If the network supports a combo HSS+UDM, the HSS+UDM may use information provided within a Cx request to identify if the MME or the AMF needs to be triggered to re-establish a PDN connection/PDU session for IMS as illustrated in FIG. 10.

FIG. 10 is a flow chart diagram illustrating yet a further embodiment of communications 1000 in a wireless communication system. The communications 1000 include messages transmitted between a UE 1002, an AMF 1004, an MME 1006, an HSS/UDM 1008, and an S-CSCF 1010. As may be appreciated, each communication described herein may include one or more messages.

The UE 1002 may be registered 1012 via IMS to either an EPS or an 5GS while operating in DR mode (e.g., connected to both EPS and 5GS).

The S-CSCF 1010 may identify 1014 an access technology via which the UE 1002 is IMS registered based on a PANI header.

The S-CSCF 1010 may detect 1016 a P-CSCF failure.

In a first communication 1018 transmitted from the S-CSCF 1010 to the HSS/UDM 1008, the S-CSCF 1010 may send via a Cx reference point to the HSS/UDM 1008 an indication for P-CSCF restoration. The S-CSCF 1010 may also include information indicating the access technology via which the UE 1002 is IMS registered. In one embodiment, the information indicating the access technology may include a Requested-Nodes AVP within the Cx request.

If the access-type and/or access-class in the PANI header identifies the IMS network that the UE 1002 is IMS registered over as EPS, the HSS/UDM 1008 may identify 1020 that the MME 1006 may need to be triggered.

The HSS/UDM 1008 may initiate 1022 a P-CSCF restoration indication to the MME 1006.

If the access-type and/or access-class in the PANI header identifies the IMS network that the UE 1002 is IMS registered over as 5GS, the HSS/UDM 1008 may identify 1024 that the AMF 1004 may need to be notified.

The HSS/UDM 1008 may notify 1026 the AMF 1004 of a P-CSCF restoration indication.

In a second communication 1028 transmitted from the HSS/UDM 1008 to the S-CSCF 1010, the HSS/UDM 1008 may transmit an acknowledgement to the S-CSCF 1010.

In various embodiments, if only the MME/HSS or AMF/UDM have IMS voice over PS supported information (e.g., if the UE provides its IMS capabilities within NAS messages) then if the S-CSCF sends a request to the HSS (or HSS+UDM combo) indicating P-CSCF restoration, the HSS may check its UDR to determine if there is an IMS over PS supported indication available or it may interrogate the MME. If the HSS/UDR or the MME does not have the IMS over PS supported indication, then the HSS may query the UDM (e.g., via a new interface or via the UTF), the HSS+UDM may query the UDR of the UDM, or the HSS may interrogate the AMF to obtain the information.

Figure 11:
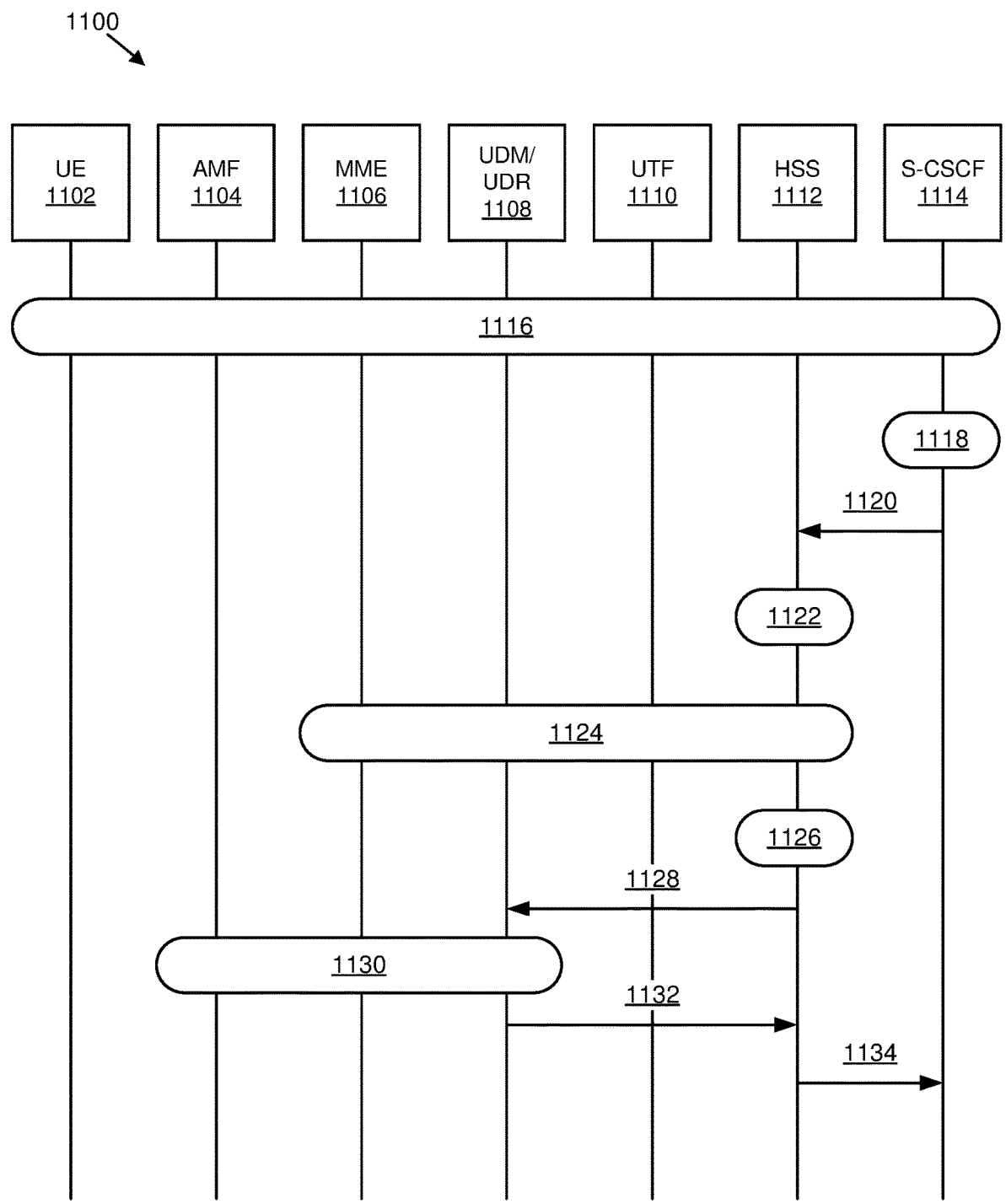
FIG. 11 is a flow chart diagram illustrating an additional embodiment of communications in a wireless communication system.

FIG. 11 illustrates one embodiment of a procedure if the network supports separate HSS and UDMs.

FIG. 11 is a flow chart diagram illustrating an additional embodiment of communications 1100 in a wireless communication system. The communications 1100 include messages transmitted between a UE 1102, an AMF 1104, an MME 1106, a UDM/UDR 1108, a UTF 1110, an HSS 1112, and an S-CSCF 1114. As may be appreciated, each communication described herein may include one or more messages.

The UE 1102 may be registered 1116 via IMS to either EPS or 5GS while operating in DR mode. The UE 1102 may only NAS register its IMS capability (e.g., such as IMS voice capability) for an access technology (e.g., either EPS or 5GS) if the UE 1102 intends to use that access technology for the IMS registration.

The S-CSCF 1114 may detect 1118 a P-CSCF failure.

In a first communication 1120 transmitted from the S-CSCF 1114 to the HSS 1112, the S-CSCF 1114 may send via a Cx reference point to the HSS 1112 an indication for P-CSCF restoration.

The HSS 1112 checks 1122 if there is information regarding support of IMS capabilities (e.g., such as IMS voice over PS support) or may query such information from the MME 1106.

If the HSS 1112 determines that IMS capabilities (e.g., such as IMS voice over PS) are supported (e.g., by interrogating the MME 1106), the HSS 1112 initiates 1124 a P-CSCF restoration indication transmission to the MME 1106. If the P-CSCF restoration is not successful, step 1132 is performed.

If the HSS 1112 determines that IMS voice over PS is not supported (e.g., there is no information on the UDM/UDR 1108 or the MME 1106), the HSS 1112 determines 1126 that the UDM/UDR 1108 needs to be triggered.

In a second communication 1128 transmitted from the HSS 1112 to the UDM/UDR 1108, the HSS 1112 may proxy the Cx request to the UDM/UDR 1108. In one embodiment, the HSS 1112 may notify the UDM/UDR 1108 via a new interface.

The UDM/UDR 1108 may notify 1130 the AMF 1104 of a P-CSCF restoration indication.

In a third communication 1132 transmitted from the UDM/UDR 1108 to the HSS 1112, the UDM/UDR 1108 may transmit an acknowledgement to the HSS 1112. In a fourth communication 1134 transmitted from the HSS 1112 to the S-CSCF 1114, the HSS 1112 may transmit an acknowledgment to the S-CSCF 1114.

As illustrated in FIG. 11, the UE 1102 IMS registers over EPS access technology and the UE 1102 may use an E-UTRA related PANI header that may be used for both EPS and 5GS to register to the IMS system. The IMS system entities (e.g., such as IMS AS) may check in both the AMF 1104 and the MME 1106 for information for IMS supported features for the UE 1102. If the UE 1102 IMS registers over 5GS access technology, the UE 1102 may use an NR related PANI header that may only be used for 5GC, the IMS system entities such as IMS AS may check the AMF 1104 for the information for IMS supported features for the UE 1102. Therefore, steps 1122 and 1124 in FIG. 11 may not be performed.

Figure 12:
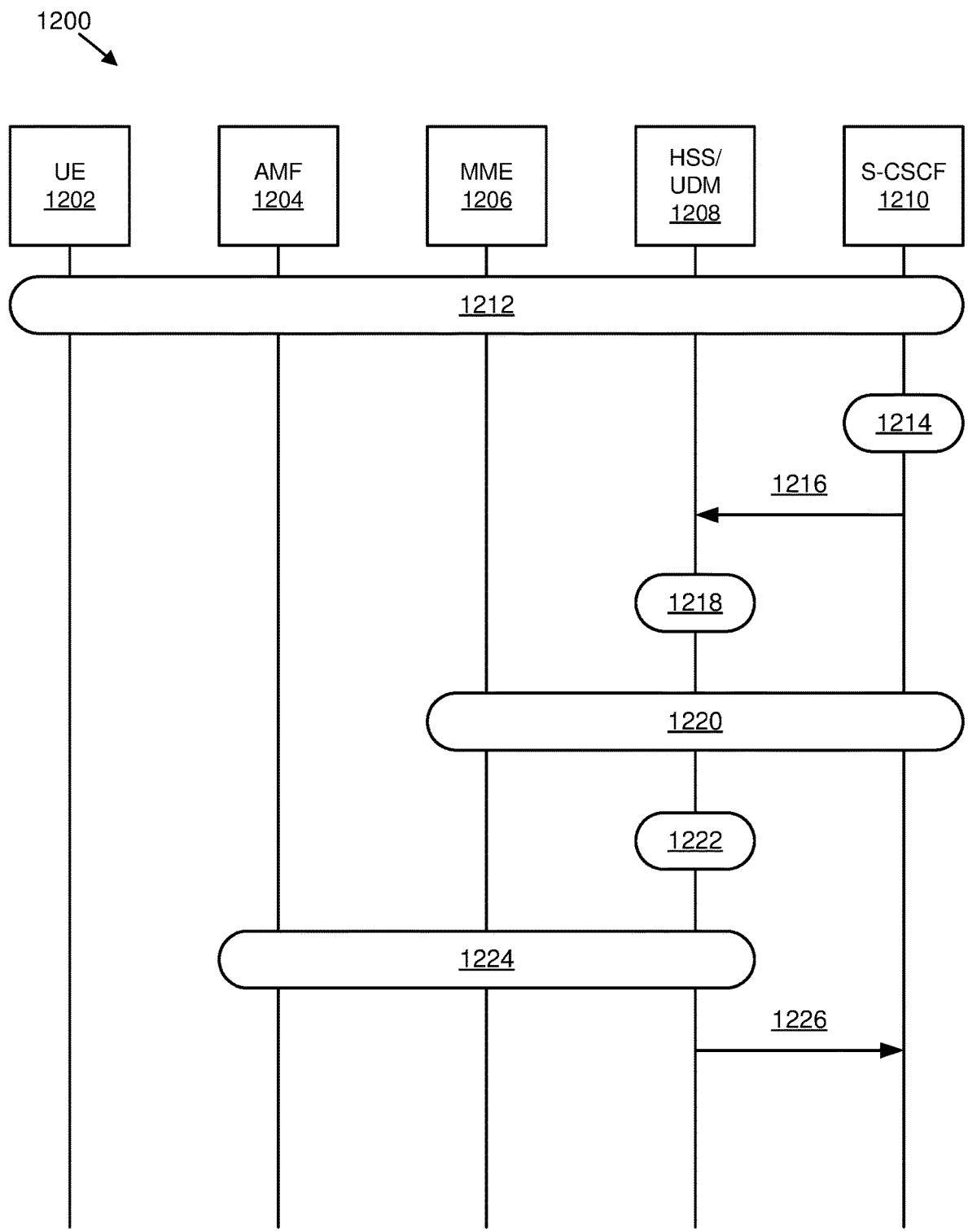
FIG. 12 is a flow chart diagram illustrating a further embodiment of communications in a wireless communication system.

If the network supports a combo HSS+UDM, the HSS+UDM may use information provided within a Cx request to identify if the MME or the AMF needs to be triggered to re-establish the PDN connection/PDU session for IMS as illustrated in FIG. 12.

FIG. 12 is a flow chart diagram illustrating a further embodiment of communications 1200 in a wireless communication system. The communications 1200 include messages transmitted between a UE 1202, an AMF 1204, an MME 1206, an HSS/UDM 1208, and an S-CSCF 1210. As may be appreciated, each communication described herein may include one or more messages.

The UE 1202 may be registered 1212 via IMS to either EPS or 5GS while operating in a DR mode (e.g., connected to both EPS and 5GS). The UE 1202 may only NAS register its IMS capability (e.g., such as IMS voice capability) for an access technology (e.g., either EPS or 5GS) if the UE 1202 intends to use that access technology for the IMS registration.

The S-CSCF 1210 may detect 1214 a P-CSCF failure.

In a first communication 1216 transmitted from the S-CSCF 1210 to the HSS/UDM 1208, the S-CSCF 1210 may send via a Cx reference point to the HSS/UDM 1208 an indication for P-CSCF restoration.

The HSS/UDM 1208 checks 1218 whether there is information regarding IMS voice over PS support at the HSS/UDM 1208 or may query the MME 1206.

If the HSS/UDM 1208 determines that IMS voice over PS is supported only at the MME 1206, the HSS/UDM 1208 initiates 1220 transmission of a P-CSCF restoration indication to the MME 1206.

The HSS/UDM 1208 may determine 1222 that IMS voice over PS is supported at the AMF 1204.

The HSS/UDM 1208 may notify 1224 the AMF 1204 of a P-CSCF restoration indication.

In a second communication 1226 transmitted from the HSS/UDM 1208 to the S-CSCF 1210, the HSS/UDM 1208 may transmit an acknowledgement to the S-CSCF 1210.

As illustrated in FIG. 12, if the UE 1202 IMS registers over EPS access technology, the UE 1202 may use an E-UTRA related PANI header that may be used for both EPS and 5GS to register to IMS system. The IMS system entities such as IMS AS may check in both the AMF 1204 and the MME 1206 for information for IMS supported features for the UE 1202. If the UE 1202 IMS registers over 5GS access technology, the UE 1202 may use an NR related PANI header that may only be used for 5GC, the IMS system entities such as IMS AS may check the AMF 1204 for the information for IMS supported features for the UE 1202. Therefore, steps 1218 and 1220 in FIG. 12 may not be performed.

In certain embodiments, the S-CSCF may have separate interfaces with the HSS (e.g., via Cx) and with the UDM (e.g., via a new reference point based on SBI). In such embodiments, the S-CSCF may derive access via which the UE is connected to the IMS based on the information included within the PANI header and may inform the HSS (e.g., via Sh) or the UDM (e.g., via the SBI reference point) of a P-CSCF restoration indication.

Figure 13:
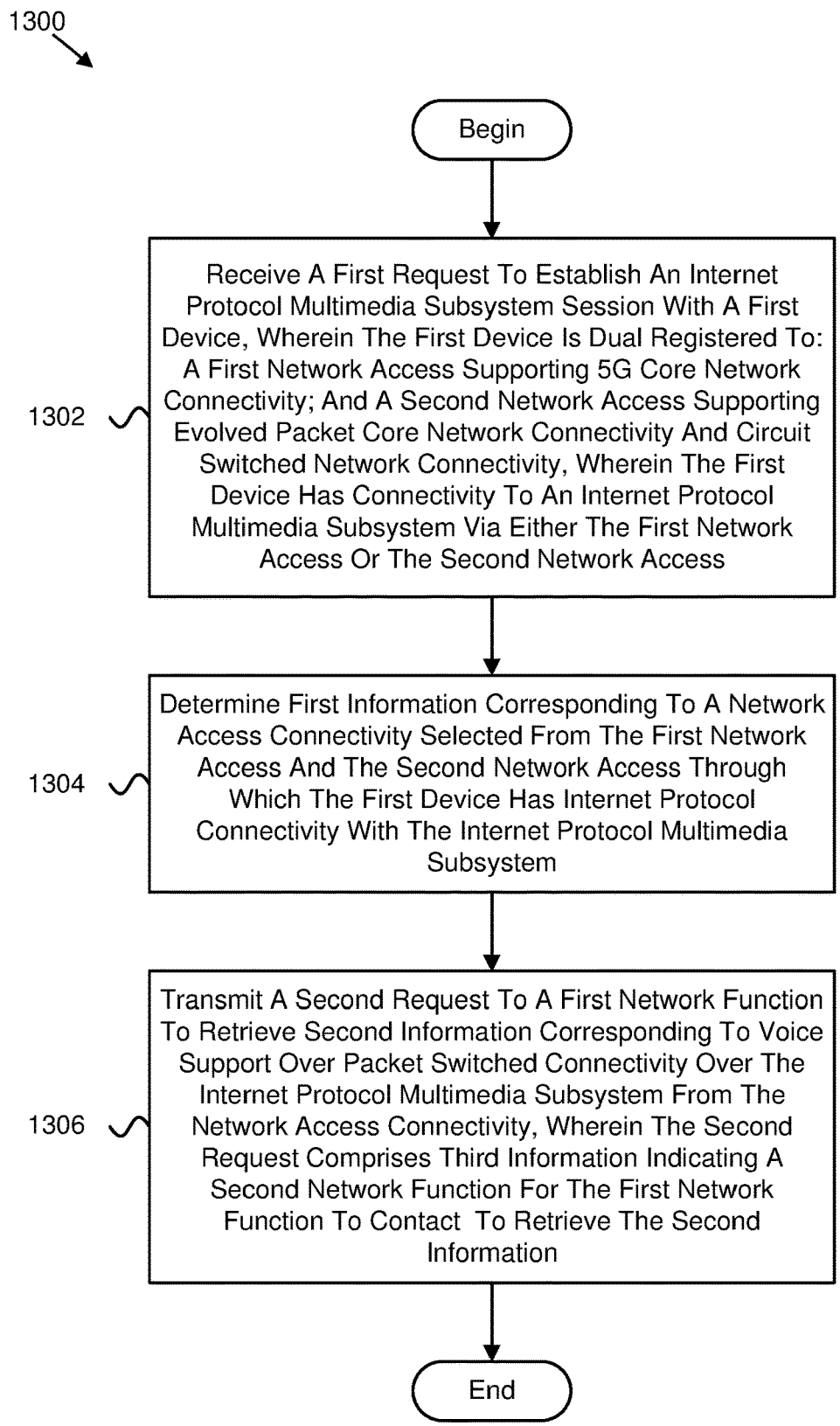
FIG. 13 is a flow chart diagram illustrating one embodiment of a method for establishing a connection with a dual registered device.

FIG. 13 is a flow chart diagram illustrating one embodiment of a method 1300 for establishing a connection with a dual registered device. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

The method 1300 may include receiving 1302 a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access. In certain embodiments, the method 1300 includes determining 1304 first information corresponding to a network access connectivity selected from the first network access and the second network access through which the first device has internet protocol connectivity with the internet protocol multimedia subsystem. In some embodiments, the method 1300 includes transmitting 1306 a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

In certain embodiments, the first information is determined to decide whether the first request is to be sent to the first device via the first network access connectivity or via the second network access connectivity. In some embodiments, the second information is determined to decide whether the first request is to be sent via the network access connectivity via circuit switched connectivity or packet switched connectivity. In various embodiments, the third information is determined based on the first information.

In one embodiment, the first information is determined from an access type included in a p access network information header of the first device. In certain embodiments, the access type indicates a type of core network. In some embodiments, the type of core network comprises an evolved packet core network or a 5G core network.

In various embodiments, the first device comprises a user equipment. In one embodiment, the second request comprises a request for terminating access domain selection information. In certain embodiments, the method 1300 further comprises receiving a message comprising a terminating access domain selection in response to transmitting the second request.

In some embodiments, the message comprises a Sh message. In various embodiments, the second network function comprises a mobility management entity, an access and mobility management function, or a combination thereof. In one embodiment, the first network function comprises a home subscriber server, a unified data management function, or a combination thereof.

Figure 14:
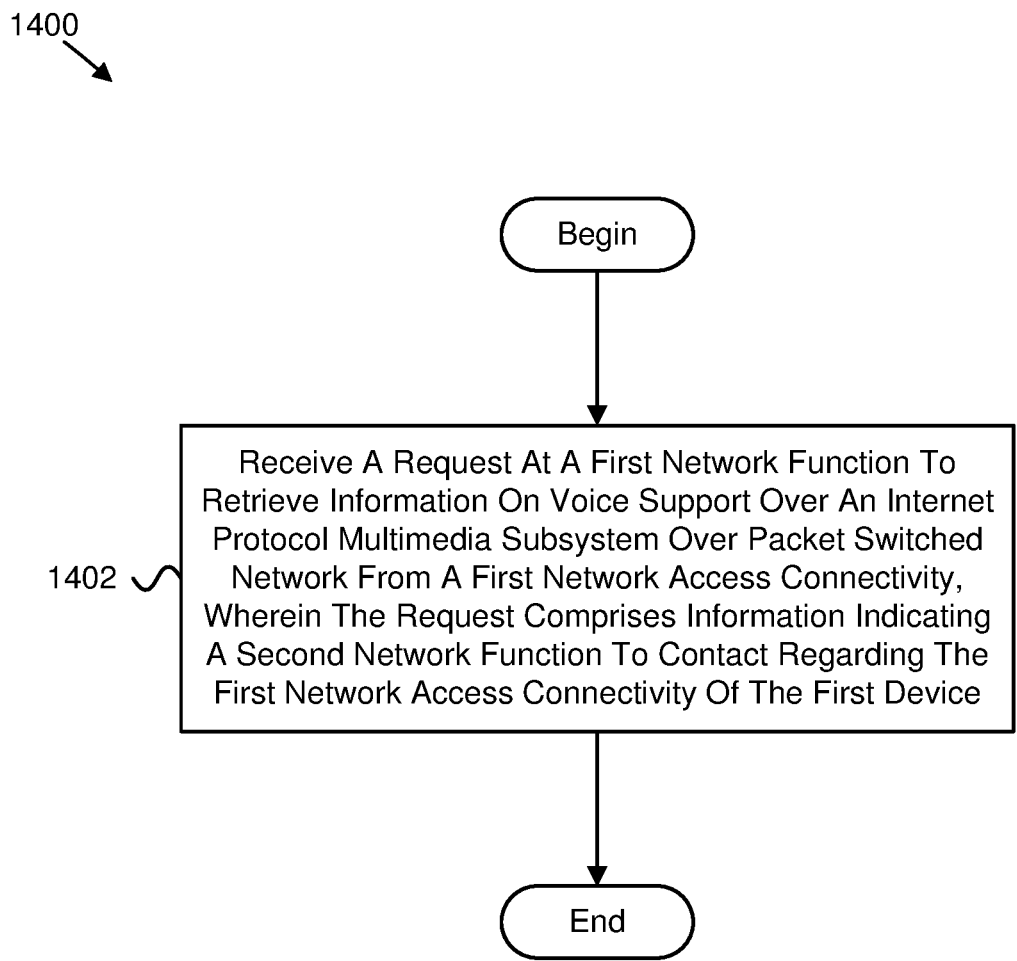
FIG. 14 is a flow chart diagram illustrating one embodiment of a method for retrieving information.

FIG. 14 is a flow chart diagram illustrating one embodiment of a method 1400 for retrieving information. In some embodiments, the method 1400 is performed by an apparatus, such as the network unit 104. In certain embodiments, the method 1400 may be performed by a processor executing program code, for example, a microcontroller, a microprocessor, a CPU, a GPU, an auxiliary processing unit, a FPGA, or the like.

The method 1400 may include receiving 1402 a request at a first network function to retrieve information on voice support over an internet protocol multimedia subsystem over packet switched network from a first network access connectivity, wherein the request comprises information indicating a second network function to contact regarding the first network access connectivity of the first device.

Figure 15:
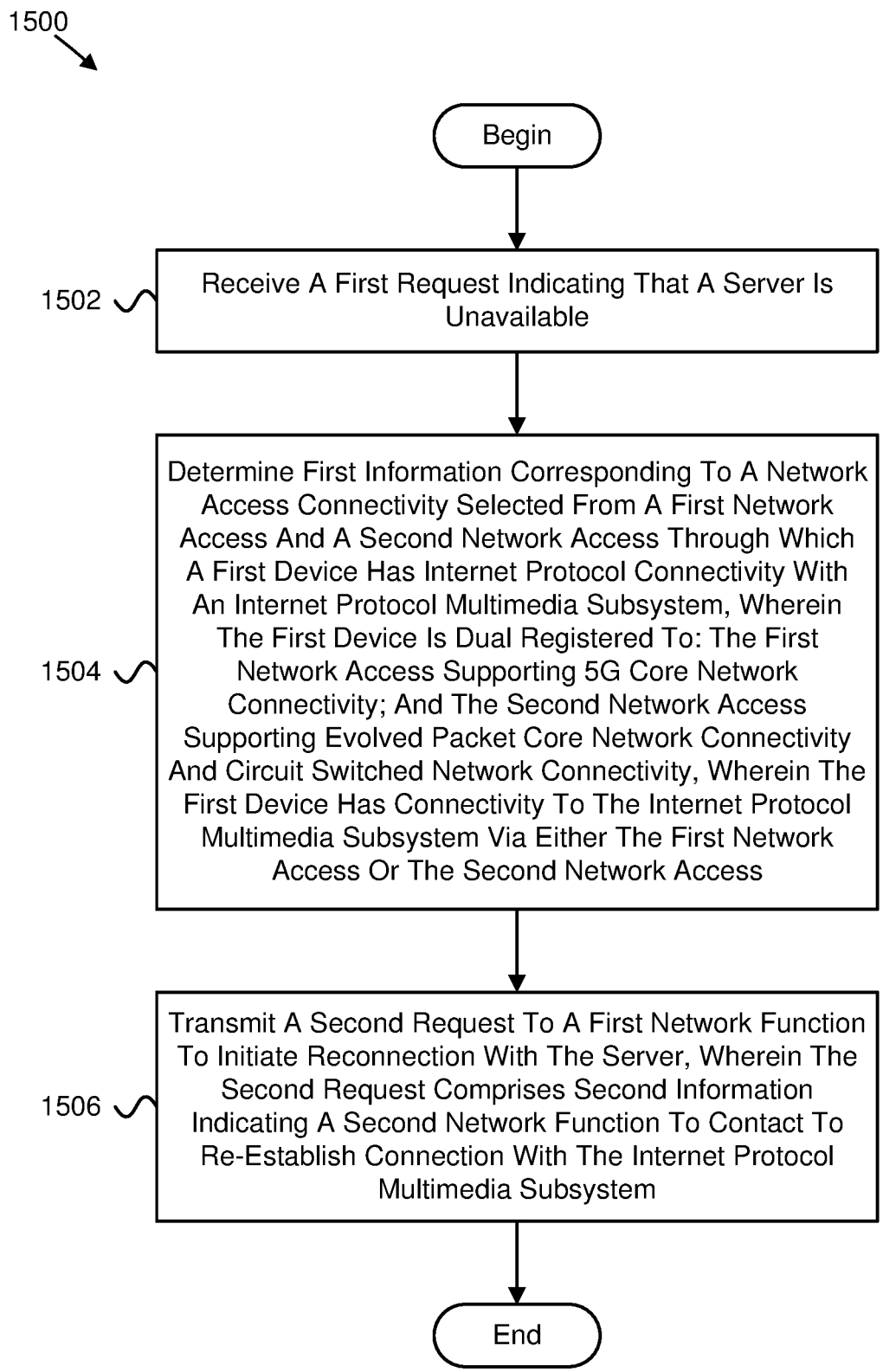
FIG. 15 is a flow chart diagram illustrating another embodiment of a method for establishing a connection with a dual registered device.

FIG. 15 is a flow chart diagram illustrating another embodiment of a method 1500 for establishing a connection with a dual registered device. In some embodiments, the method 1500 is performed by an apparatus, such as the network unit 104. In certain embodiments, the method 1500 may be performed by a processor executing program code, for example, a microcontroller, a microprocessor, a CPU, a GPU, an auxiliary processing unit, a FPGA, or the like.

The method 1500 may include receiving 1502 a first request indicating that a server is unavailable. In certain embodiments, the method 1500 includes determining 1504 first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access. In some embodiments, the method 1500 includes transmitting 1506 a second request to a first network function to initiate reconnection with the server, wherein the second request comprises second information indicating a second network function to contact to re-establish connection with the internet protocol multimedia subsystem.

In certain embodiments, the first information is determined from an access type included in a p access network information header of the first device. In some embodiments, the access type indicates a type of core network. In various embodiments, the type of core network comprises an evolved packet core network or a 5G core network.

In one embodiment, the second information is determined based on the first information. In certain embodiments, the first device comprises a user equipment. In some embodiments, the first network function comprises a home subscriber server, a unified data management function, or a combination thereof.

In various embodiments, the second network function comprises a mobility management entity, an access and mobility management function, or a combination thereof. In one embodiment, the server comprises a proxy-call session control function.

In one embodiment, a method comprises: receiving a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access; determining first information corresponding to a network access connectivity selected from the first network access and the second network access through which the first device has internet protocol connectivity with the internet protocol multimedia subsystem; and transmitting a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

In certain embodiments, the first information is determined to decide whether the first request is to be sent to the first device via the first network access connectivity or via the second network access connectivity.

In some embodiments, the second information is determined to decide whether the first request is to be sent via the network access connectivity via circuit switched connectivity or packet switched connectivity.

In various embodiments, the third information is determined based on the first information.

In one embodiment, the first information is determined from an access type included in a p access network information header of the first device.

In certain embodiments, the access type indicates a type of core network.

In some embodiments, the type of core network comprises an evolved packet core network or a 5G core network.

In various embodiments, the first device comprises a user equipment.

In one embodiment, the second request comprises a request for terminating access domain selection information.

In certain embodiments, the method further comprises receiving a message comprising a terminating access domain selection in response to transmitting the second request.

In some embodiments, the message comprises a Sh message.

In various embodiments, the second network function comprises a mobility management entity, an access and mobility management function, or a combination thereof.

In one embodiment, the first network function comprises a home subscriber server, a unified data management function, or a combination thereof.

In one embodiment, an apparatus comprises: a receiver that receives a first request to establish an internet protocol multimedia subsystem session with a first device, wherein the first device is dual registered to: a first network access supporting 5G core network connectivity; and a second network access supporting evolved packet core network connectivity and circuit switched network connectivity, wherein the first device has connectivity to an internet protocol multimedia subsystem via either the first network access or the second network access; a processor that determines first information corresponding to a network access connectivity selected from the first network access and the second network access through which the first device has internet protocol connectivity with the internet protocol multimedia subsystem; and a transmitter that transmits a second request to a first network function to retrieve second information corresponding to voice support over packet switched connectivity over the internet protocol multimedia subsystem from the network access connectivity, wherein the second request comprises third information indicating a second network function for the first network function to contact to retrieve the second information.

In certain embodiments, the first information is determined to decide whether the first request is to be sent to the first device via the first network access connectivity or via the second network access connectivity.

In some embodiments, the second information is determined to decide whether the first request is to be sent via the network access connectivity via circuit switched connectivity or packet switched connectivity.

In various embodiments, the third information is determined based on the first information.

In one embodiment, the first information is determined from an access type included in a p access network information header of the first device.

In certain embodiments, the access type indicates a type of core network.

In some embodiments, the type of core network comprises an evolved packet core network or a 5G core network.

In various embodiments, the first device comprises a user equipment.

In one embodiment, the second request comprises a request for terminating access domain selection information.

In certain embodiments, the receiver receives a message comprising a terminating access domain selection in response to transmitting the second request.

In some embodiments, the message comprises a Sh message.

In various embodiments, the second network function comprises a mobility management entity, an access and mobility management function, or a combination thereof.

In one embodiment, the first network function comprises a home subscriber server, a unified data management function, or a combination thereof.

In one embodiment, a method comprises: receiving a request at a first network function to retrieve information on voice support over an internet protocol multimedia subsystem over packet switched network from a first network access connectivity, wherein the request comprises information indicating a second network function to contact regarding the first network access connectivity of the first device.

In one embodiment, an apparatus comprises: a receiver that receives a request at a first network function to retrieve information on voice support over an internet protocol multimedia subsystem over packet switched network from a first network access connectivity, wherein the request comprises information indicating a second network function to contact regarding the first network access connectivity of the first device.

In one embodiment, a method comprises: receiving a first request indicating that a server is unavailable; determining first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access; and transmitting a second request to a first network function to initiate reconnection with the server, wherein the second request comprises second information indicating a second network function to contact to re-establish connection with the internet protocol multimedia subsystem.

In certain embodiments, the first information is determined from an access type included in a p access network information header of the first device.

In some embodiments, the access type indicates a type of core network.

In various embodiments, the type of core network comprises an evolved packet core network or a 5G core network.

In one embodiment, the second information is determined based on the first information.

In certain embodiments, the first device comprises a user equipment.

In some embodiments, the first network function comprises a home subscriber server, a unified data management function, or a combination thereof.

In various embodiments, the second network function comprises a mobility management entity, an access and mobility management function, or a combination thereof.

In one embodiment, the server comprises a proxy-call session control function.

In one embodiment, an apparatus comprises: a receiver that receives a first request indicating that a server is unavailable; a processor that determines first information corresponding to a network access connectivity selected from a first network access and a second network access through which a first device has internet protocol connectivity with an internet protocol multimedia subsystem, wherein the first device is dual registered to: the first network access supporting 5G core network connectivity; and the second network access supporting evolved packet core network connectivity and circuit switched network connectivity, wherein the first device has connectivity to the internet protocol multimedia subsystem via either the first network access or the second network access; and a transmitter that transmits a second request to a first network function to initiate reconnection with the server, wherein the second request comprises second information indicating a second network function to contact to re-establish connection with the internet protocol multimedia subsystem.

In certain embodiments, the first information is determined from an access type included in a p access network information header of the first device.

In some embodiments, the access type indicates a type of core network.

In various embodiments, the type of core network comprises an evolved packet core network or a 5G core network.

In one embodiment, the second information is determined based on the first information.

In certain embodiments, the first device comprises a user equipment.

In some embodiments, the first network function comprises a home subscriber server, a unified data management function, or a combination thereof.

In various embodiments, the second network function comprises a mobility management entity, an access and mobility management function, or a combination thereof.

In one embodiment, the server comprises a proxy-call session control function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at an internet protocol multimedia subsystem (IMS) application service (AS), the method comprising: receiving a first request to establish an IMS session with a first device, wherein the first device is dual registered to: a first network access supporting fifth generation (5G) core network connectivity; and a second network access supporting evolved packet core network connectivity and circuit switched network connectivity, wherein the first device has connectivity to an IMS via either the first network access or the second network access; determining first information corresponding to a network access connectivity selected from the first network access and the second network access through which the first device has internet protocol connectivity with the IMS; and transmitting a second request to a first network function to retrieve second information corresponding to voice support over packet switched connectivity over the IMS from the network access connectivity, wherein the second request comprises third information indicating a second network function of a plurality of second network functions for the first network function to contact to retrieve the second information, and the second network function is contacted by the first network function to retrieve the second information in response to receiving the second request, the first network function comprises a home subscriber server (HSS), a unified data management function (UDM), or a combination thereof, and the plurality of second network functions comprises a mobility management entity (MME) and an access and mobility management function (AMF).

2. The method of claim 1, wherein the first information is determined to decide whether the first request is to be sent to the first device via the first network access connectivity or via the second network access connectivity.

3. The method of claim 1, wherein the second information is determined to decide whether the first request is to be sent via the network access connectivity via circuit switched connectivity or packet switched connectivity.

4. The method of claim 1, wherein the third information is determined based on the first information.

5. The method of claim 1, wherein the first information is determined from an access type included in a p access network information (PANI) header of the first device.

6. The method of claim 5, wherein the access type indicates a type of core network.

7. The method of claim 6, wherein the type of core network comprises an EPC network or a 5G core network.

8. The method of claim 1, wherein the first device comprises a user equipment.

9. The method of claim 1, wherein the second request comprises a request for terminating access domain selection information.

10. The method of claim 1, further comprising receiving a message comprising a terminating access domain selection in response to transmitting the second request.

11. The method of claim 10, wherein the message comprises a Sh message.

12. An apparatus comprising:
a receiver that receives a first request to establish an internet protocol multimedia subsystem (IMS) session with a first device, wherein the first device is dual registered to:
a first network access supporting fifth generation core network connectivity; and
a second network access supporting evolved packet core network connectivity and circuit switched network connectivity, wherein the first device has connectivity to an IMS via either the first network access or the second network access;
a processor that determines first information corresponding to a network access connectivity selected from the first network access and the second network access through which the first device has internet protocol connectivity IMS; and
a transmitter that transmits a second request to a first network function to retrieve second information corresponding to voice support over packet switched connectivity over the IMS from the network access connectivity, wherein the second request comprises third information indicating a second network function of a plurality of second network functions for the first network function to contact to retrieve the second information, the first network function contacts the second network function to retrieve the second information in response to receiving the second request, the first network function comprises a home subscriber server (HSS), a unified data management (UDM) function, or a combination thereof, and the plurality of second network functions comprises a mobility management entity (MME) and an access and mobility management function (AMF).

13. The apparatus of claim 12, wherein the first information is determined to decide whether the first request is to be sent to the first device via the first network access connectivity or via the second network access connectivity.

14. The apparatus of claim 12, wherein the second information is determined to decide whether the first request is to be sent via the network access connectivity via circuit switched connectivity or packet switched connectivity.

15. The apparatus of claim 12, wherein the third information is determined based on the first information.

16. The apparatus of claim 12, wherein the first information is determined from an access type included in a p access network information (PANI) header of the first device.

\* \* \* \* \*